US006297846B1

(12) United States Patent
Edanami

(10) Patent No.: US 6,297,846 B1
(45) Date of Patent: Oct. 2, 2001

(54) DISPLAY CONTROL SYSTEM FOR VIDEOCONFERENCE TERMINALS

(75) Inventor: Takafumi Edanami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/865,027

(22) Filed: May 29, 1997

(30) Foreign Application Priority Data

May 30, 1996 (JP) .................................................. 8-136251
Mar. 3, 1997 (JP) .................................................. 9-047849

(51) Int. Cl.[7] ............................. H04N 5/262; H04N 7/14
(52) U.S. Cl. ...................... 348/239; 348/14.07; 348/14.1
(58) Field of Search ............................. 348/156, 15, 155, 348/169, 239, 240, 211, 214; 382/103, 203

(56) References Cited

U.S. PATENT DOCUMENTS

| 5,488,675 | * | 1/1996 | Hanna | 382/103 |
| 5,530,771 | * | 6/1996 | Maekawa | 382/103 |
| 5,737,011 | * | 4/1998 | Lukacs | 348/15 |
| 5,742,329 | * | 4/1998 | Masunaga et al. | 348/15 |
| 5,790,695 | * | 8/1998 | Suwa | 382/103 |
| 5,815,199 | * | 9/1998 | Palm et al. | 348/156 |
| 5,835,641 | * | 11/1998 | Sotoda et al. | 348/169 |
| 5,999,214 | * | 12/1999 | Inagaki | 348/15 |

FOREIGN PATENT DOCUMENTS

| 63-182788 | 7/1988 | (JP) . |
| 63-223974 | 9/1988 | (JP) . |

\* cited by examiner

*Primary Examiner*—Wendy R. Garber
*Assistant Examiner*—Luong Nguyen
(74) *Attorney, Agent, or Firm*—Helfgott & Karas, PC

(57) ABSTRACT

A display control system for a videoconference terminal capable of displaying proper images of participants. A video camera captures wide-angle source pictures including the images of participants. The source pictures are sent to a participant position detector and image clipping unit. The participant position detector detects a participant position by examining the source pictures. Depending on the on-screen movement observed in the participant position detected by the participant position detector, the image clipping unit determines an appropriate clipping window. It clips the desired image out of the source pictures as defined by the clipping window. A screen adjustment unit adjusts the image size so that it will fit to the actual screen size.

11 Claims, 19 Drawing Sheets

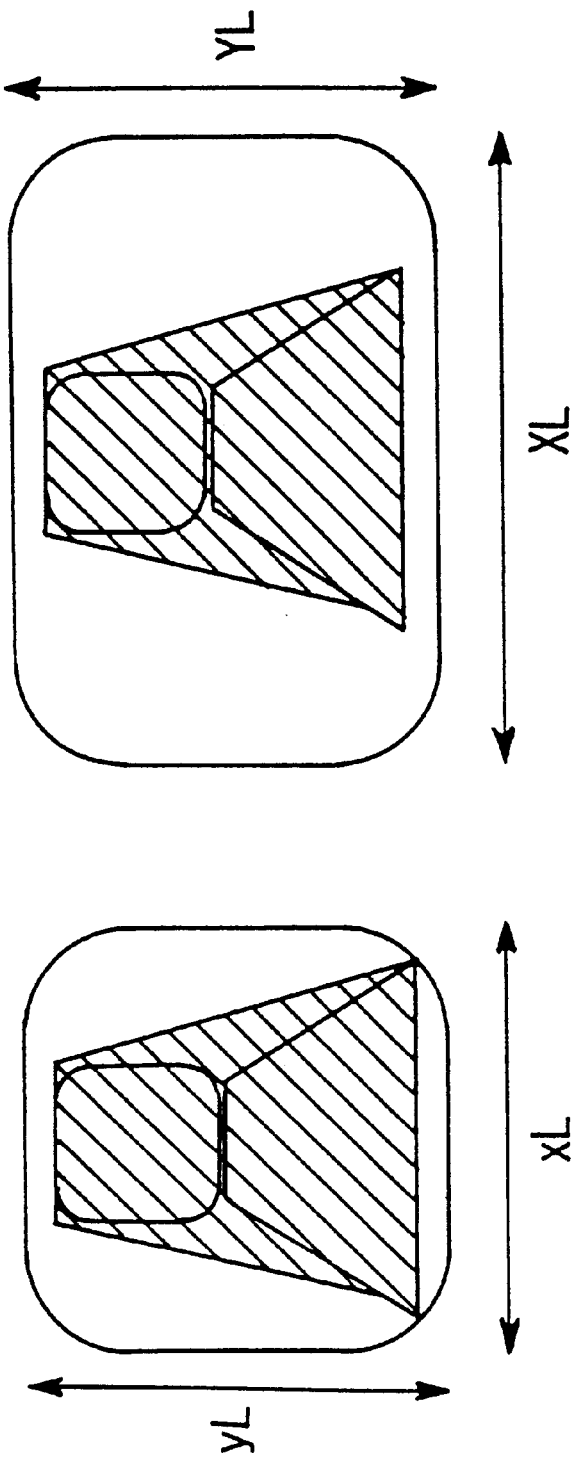

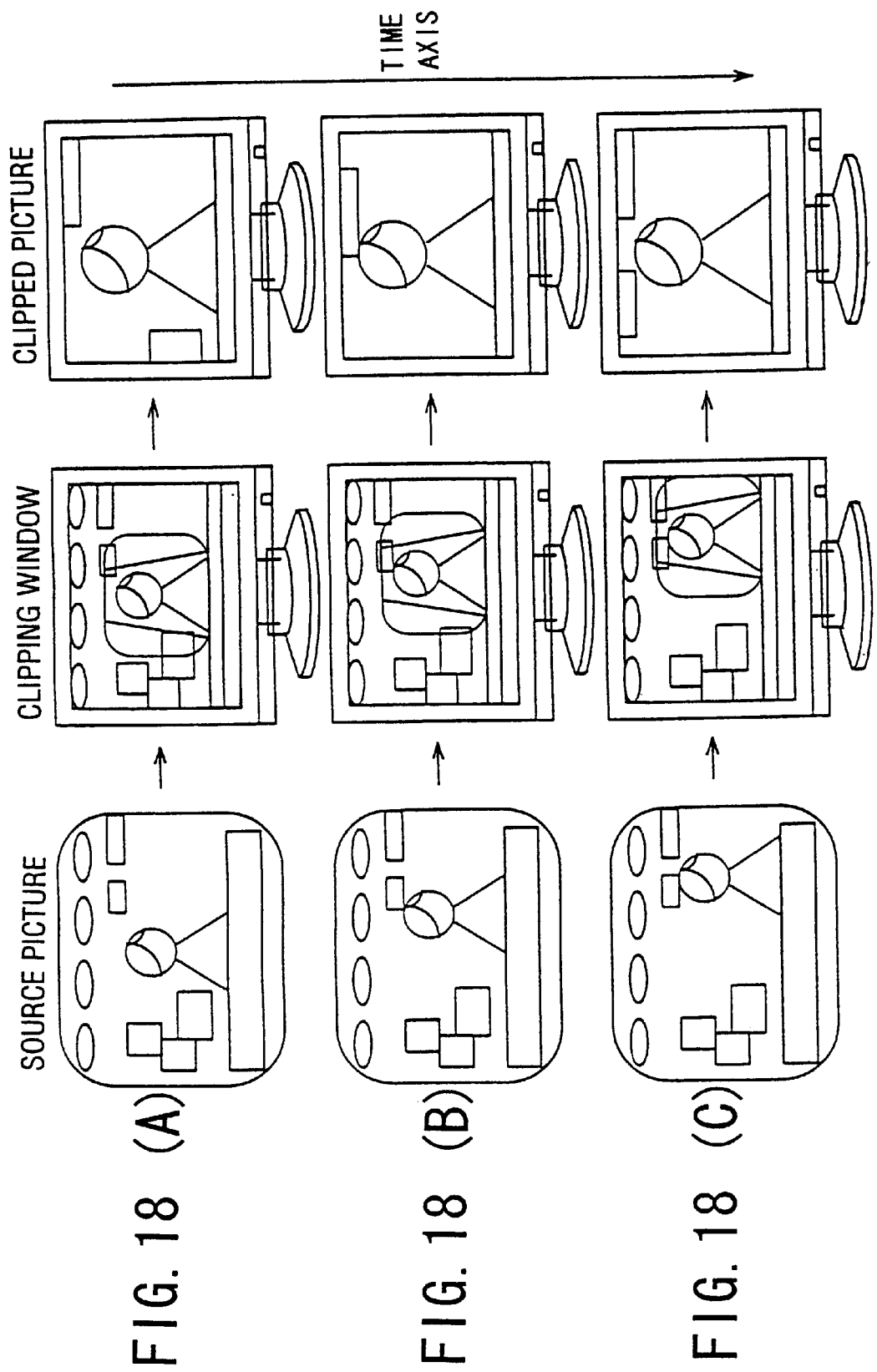

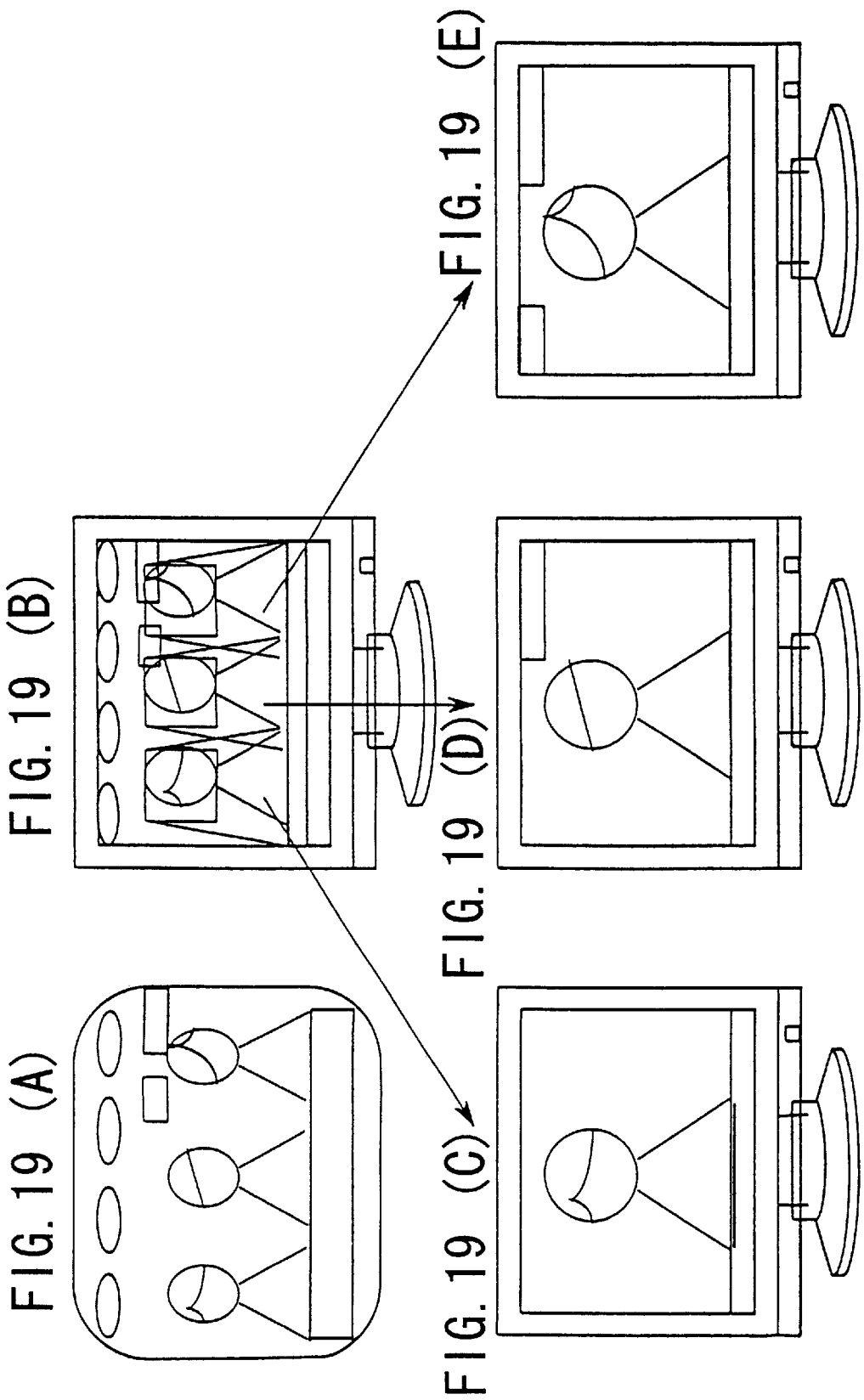

DISPLAY CONTROL SYSTEM FOR VIDEOCONFERENCE TERMINALS

BACKGROUND OF THE INVENTION

1. Field of the Invention

The present invention relates to a display control system for videoconference terminals, and more particularly, to a display control system for videoconference terminals which is capable of displaying natural and proper images of participants in a videoconference.

2. Description of the Related Art

Videoconference systems provide bidirectional video and audio communication between two (or more) distant parties via a video coder and decoder. A simple but important thing to note when using a videoconference system is that the local video camera must be properly positioned so that a person participating in the conference can be seen on a terminal screen at the distant site. Such camera adjustment should be done before the videoconference begins and also in the middle of the session. Otherwise, the video reproduced at the receiving end could sometimes show only a part of the participant's body or, in the worst case, nothing but a background wall, due to improper camera settings. The lack of visual images in videoconferencing will make it difficult for the participating parties to feel a sense of togetherness, hindering smooth proceeding of even a well-prepared videoconference. The following will provide further detail of this problem in capturing of participant's images.

Most videoconference terminals used in today's typical videoconference systems provide a feature of simultaneous local and remote video views, allowing users to monitor the image of themselves appearing in a small window as part of a monitor screen. In such a videoconference terminal, a conference participant at the sending end should check the monitor screen periodically to confirm that his video image is being properly captured and transmitted to the distant receiving end. If it was off the local video view window, he/she has to adjust the camera angle by hand or some other means. Therefore, he/she must always pay attention to the local video view window and sometimes leave his/her seat to make a correction of camera angle. This will certainly interrupt the discussion and disturb the smooth proceeding of the videoconference.

Some systems provide remote camera control capabilities with zoom, pan, and tilt functions integrated into the camera mechanisms, which allow the local site to control the camera located at the distant site. This feature may be useful, but it still means that someone should take care of such a remote camera control. In a situation where the participant has to serve as a camera operator, he/she will not be able to concentrate on the discussion. Therefore, the remote camera control cannot solve the problem.

As described above, conventional videoconference systems require an operator who will watch the local video view and take care of the camera angles in order to keep showing a correct picture of the local cite (i.e., the sending end) to other participants at the distant site (i.e., the receiving end). To eliminate such assistance of a human operator, the following videoconference system is being proposed. This proposed system employs a wide-angle high-resolution camera set up at a fixed position to take a long shot that covers the entire conference room including a participant. The participant's image, as part of the global picture captured by the wide-angle camera, is identified and cut out to obtain his/her portrait image of a fixed size. The clipped picture is delivered to the distant cite, after being applied some appropriate scaling operations so that it will fit into a monitor screen at the distant cite. The system automatically tracks any movement of the participant if it is within the sight of the fixed wide-angle camera, and will display his or her picture in the center of the remote monitor screen.

This improved videoconference system with automatic tracking capabilities, however, has a problem in its image identification algorithm as described later. Also, even if the participant's picture has been successfully obtained, the picture will suffer from a side effect of the automatic tracking function. More specifically, the portrait picture is cut out of the captured image, with the focus always placed right on the participant wherever he/she may move. This leads to a difficulty for the viewers to see the entire circumstances including the participant's movement and the background scenes. Further, the clipped picture is accompanied by such a side effect that it looks as if the person in the picture were fixed but his/her background were moving, as in the case of moving the camera too quickly to follow. This effect will confuse the viewers and destroy clarity of the reproduced picture.

Regarding the subject identification algorithm mentioned above, there is a well-known technique that first captures a background picture alone with no participants included and uses it as a reference image to compare with each camera shot taken in a conference session, thereby identifying and locating the subjects. Trouble is, however, this algorithm can work only on the assumption that the background image will never vary with time, which also means that it is not allowed to change the camera angle or location during the session.

There is proposed another subject identification algorithm, which locates a subject by calculating the differences between one video frame and the next, or the magnitude of interframe motion. However, the picture will suffer from such noises that are introduced by some slight differences between frames or a motion in the background image. It is therefore difficult to detect the subject with accuracy in a reliable way.

SUMMARY OF THE INVENTION

Taking the above into consideration, an object of the present invention is to provide a display control system for videoconference terminals, which enables reliable detection of subject participants and also provides automatic control to maintain the clarity of their images even if the subjects are moving.

To accomplish the above object, according to the present invention, there is provided a display control system for a videoconference terminal which is capable of displaying a proper image of a participant in a videoconference. This system comprises: participant position detection means for detecting a participant position based on a wide-angle source picture provided by a camera; image clipping means for determining a clipping window which includes the image of the participant, according to an on-screen movement of the participant position detected by the participant position detection means, and for obtaining a clipped picture by cutting an image within the clipping window out of the wide-angle source picture; and screen adjustment means for making a size adjustment of the clipped picture obtained by the image clipping means so that the clipped picture will fit to a screen size of a video monitor unit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 17(A) is a diagram showing the shape of an image clipping window;

FIG. 17(B) is a diagram showing the shape of the image clipping window that is adjusted in accordance with the aspect ratio of a monitor screen;

FIGS. 18(A), 18(B), and 18(C) are diagrams showing how a portrait rectangle is cut out from an actual camera shot;

FIG. 19(A) is a diagram showing a video camera output in which a plurality of participants are captured;

FIG. 19(B) is a diagram showing a screen shot displaying a clipped picture that includes all participants;

FIG. 19(C) is a diagram showing a screen shot displaying a clipped picture that includes only one participant;

FIG. 19(D) is a diagram showing a screen shot displaying a clipped picture that includes another particular participant; and FIG. 19(E) is a diagram showing a screen shot displaying a clipped picture that includes still another participant.

DESCRIPTION OF THE PREFERRED EMBODIMENTS

Several embodiments of the present invention will be described below with reference to the accompanying drawings.

Figure 1:
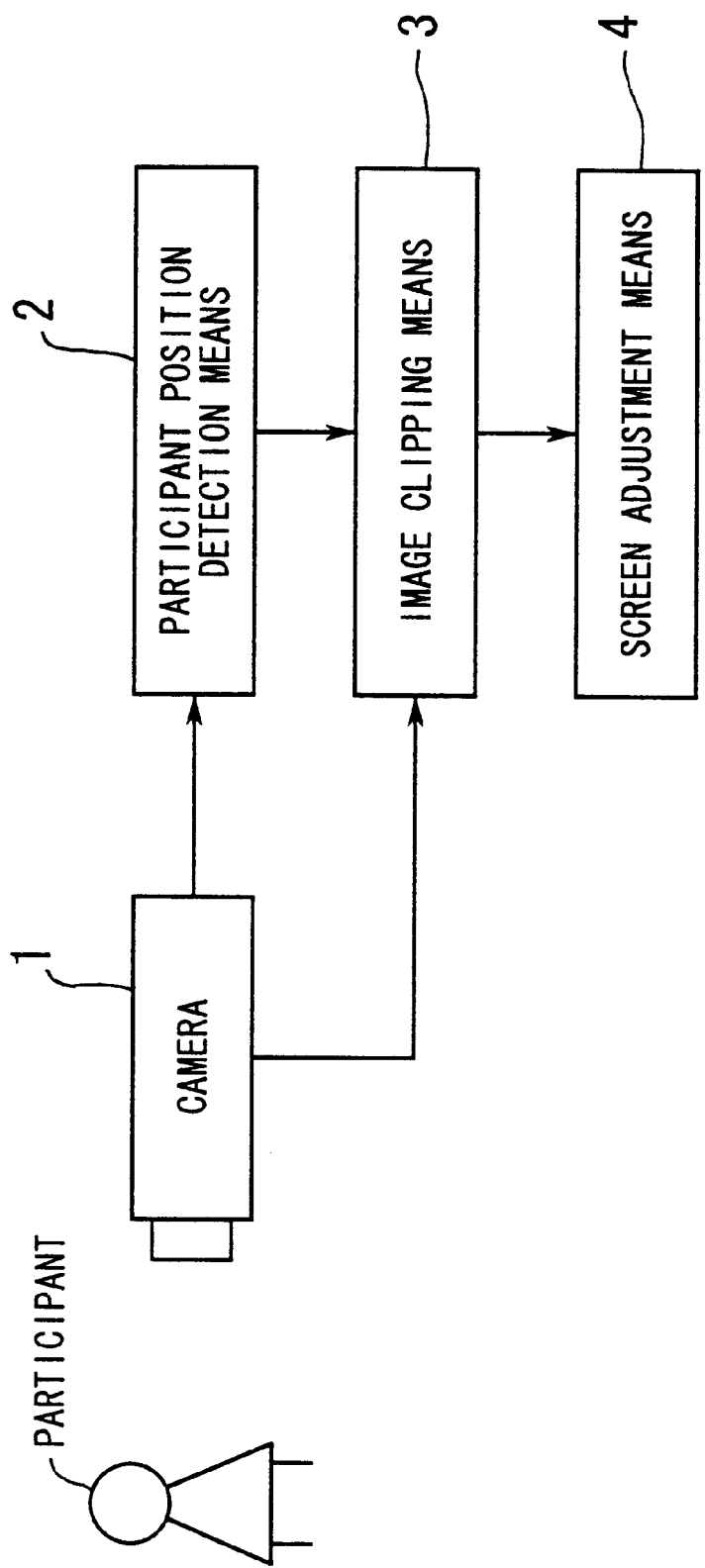
FIG. 1 is a diagram schematically showing the concept of the present invention.

First, the concept of a display control system for videoconference terminals proposed in a first embodiment of the present invention will be explained with reference to FIG. 1.

A display control system of the first embodiment comprises the following elements: participant position detection means 2 for detecting a participant position based on a wide-angle source picture provided by a camera 1; image clipping means 3 for determining a clipping window which includes the image of the participant, according to an on-screen movement of the participant position detected by the participant position detection means 2, and for obtaining a clipped picture by cutting an image within the clipping window out of the wide-angle source picture; and screen adjustment means 4 for making a size adjustment of the clipped picture obtained by the image clipping means 3 so that the clipped picture will fit to a screen size of a video monitor unit.

In the above-described structural arrangement, the camera 1, which is a wide-angle video camera placed at a fixed position, captures a wide-angle picture that covers the entire view of the conference room, including a participant in the conference. The captured picture is sent to the participant position detection means 2 and the image clipping means 3. The participant position detection means 2 detects the position of the participant based on the wide-angle picture received from the camera 1. More specifically, the participant position detection means 2 first locates the participant's face in the received picture and, based on this face position, detects the position of his/her body. Here, the participant position detection means 2 uses facial color information and motion vectors to identify the face and body of the participant.

Subsequently, the image clipping means 3 determines an image area from which the participant's image will be cut out and displayed, according to the magnitude of the participant's on-screen motion detected by the participant position detection means 2. Then the image clipping means 3 cuts out a part of the original wide-angle picture captured by the camera 1 according to the determined image area. That is, the image clipping means 3 gives a larger image area for a larger on-screen motion and a smaller image area for a smaller on-screen motion, and then it extracts a picture of the determined range out of the picture captured by the camera 1.

Lastly, the screen adjustment means 4 adjusts the size of the picture clipped by the image clipping means 3 so that it will fit to the monitor screen.

In the way described above, the display control system of the present invention reliably extracts a participant's image from each camera shot and clearly displays the clipped image while keeping track of his/her movement and automatically zooming in and out on the picture.

Figure 2:
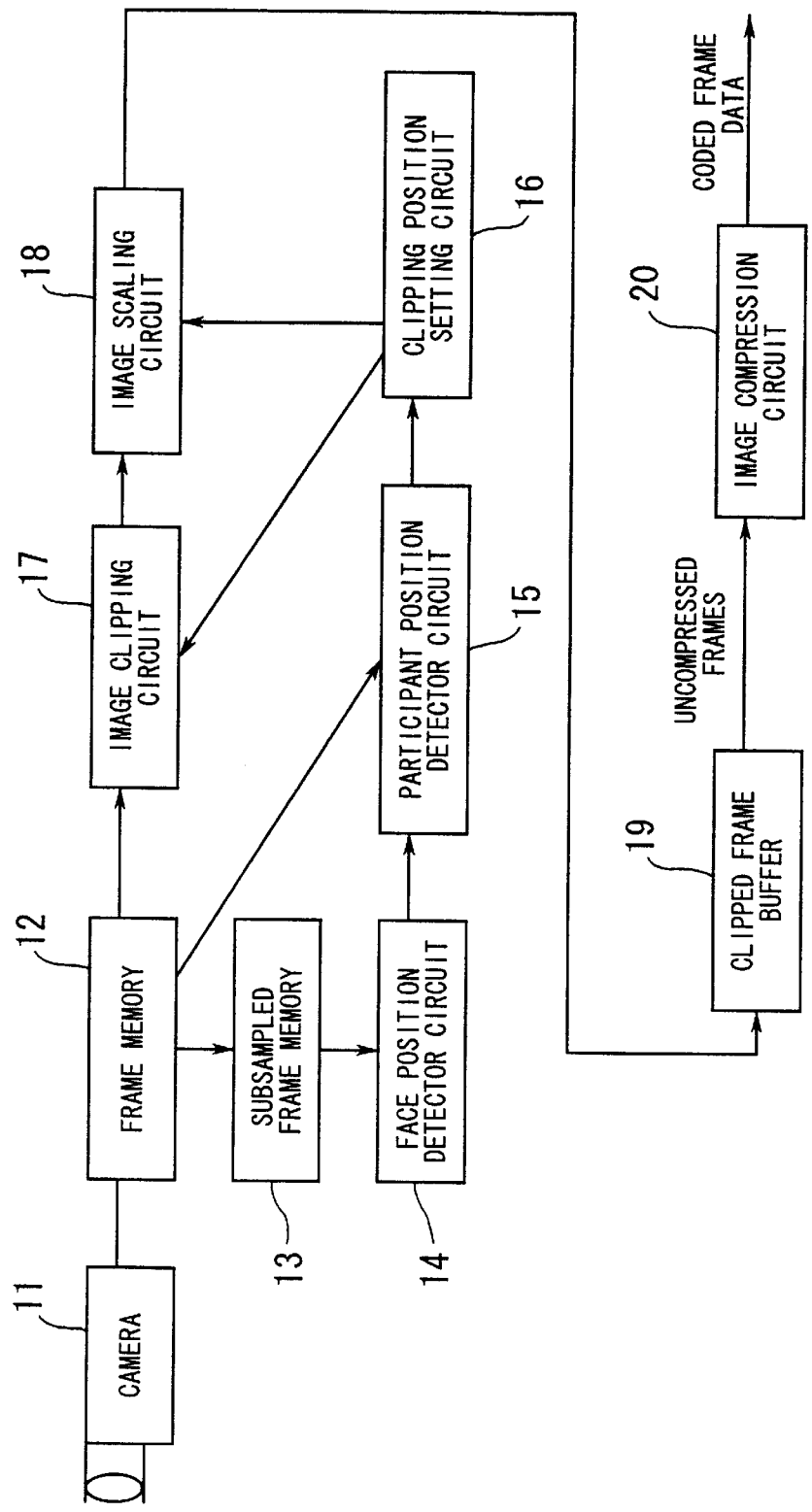
FIG. 2 is a block diagram showing a specific structure of a first embodiment of the present invention.

FIG. 2 is a block diagram showing a specific structure of the first embodiment of the present invention. The relationship between the elements shown in this FIG. 2 and those in FIG. 1 will be clarified after giving the explanation for the block diagram of FIG. 2.

Referring to FIG. 2, a camera 11 captures the overall view of the conference room including participants and sends the video pictures to a frame memory 12 for storage. This camera 11 is a wide-angle high-resolution video camera capable of capturing pictures of a wide spatial range with high definition. Note that the camera 11 is not equipped with any zooming or panning mechanisms but placed at a predetermined position in a fixed orientation.

The picture information once stored in the frame memory 12 is retrieved and sampled at certain pixel intervals, and the resultant picture is stored into a subsampled frame memory 13. A face position detector circuit 14 detects the face position and size of a subject participant by applying some image signal processing techniques to the picture information retrieved from the subsampled frame memory 13. With the detected face position and size, a participant position detector circuit 15 locates the body of the subject participant in the picture. According to the detected body position, a clipping position setting circuit 16 sets an image area from which a portrait picture of the subject participant will be cut out. More specifically, the clipping position setting circuit 16 defines a large clipping window when the subject person is moving. As will be described later, this operation will cause a "zoom-out" effect on the field of view. When in turn no motion is observed, the clipping position setting circuit 16 sets a smaller clipping window, which will cause a "zoom-in" effect.

After adjusting the aspect ratio of the image window defined by the clipping position setting circuit 16, an image clipping circuit 17 cuts the picture within the defined clipping window out of the original wide-angle picture. This clipped picture is then sent to an image scaling circuit 18 for size adjustment. The image scaling circuit 18 changes the size of the clipped picture so that it will fit to the monitor screen of receiving-end equipment, and it stores the picture data to a clipped frame buffer 19. An image compression circuit 20 retrieves pictures from the clipped frame buffer 19 and encodes them by using several data compression techniques such as the ITU-T videoconferencing standards H.261.

The relationship between the elements shown in FIG. 1 and those in FIG. 2 are as follows. The camera 1 in FIG. 1 corresponds to the camera 11 in FIG. 2. The participant position detection means 2 in FIG. 1 is implemented as the face position detector circuit 14 and participant position detector circuit 15 in FIG. 2. The image clipping means 3 in FIG. 1 corresponds to the combination of the clipping position setting circuit 16 and image clipping circuit 17. The screen adjustment means 4 in FIG. 1 is equivalent to the image scaling circuit 18.

Figure 3:
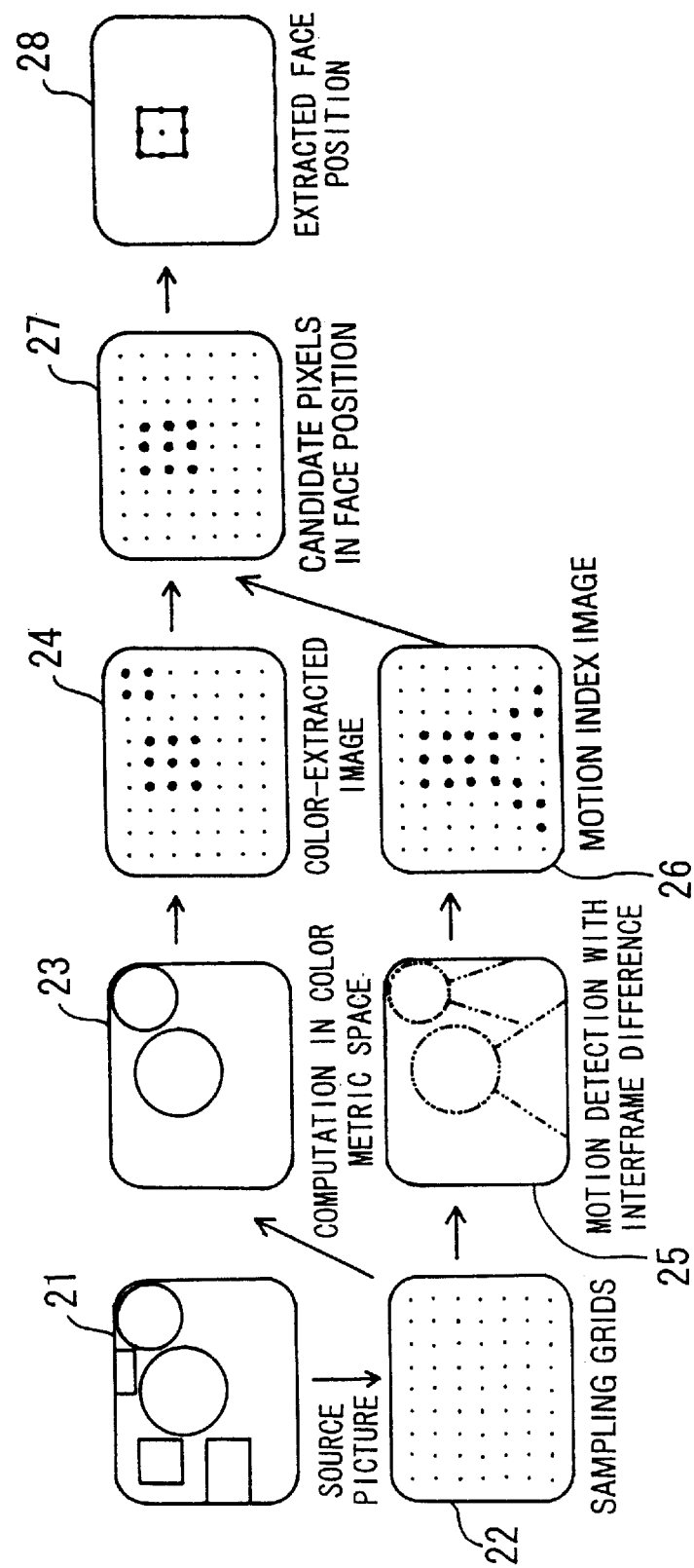
FIG. 3 is a diagram explaining the operation of a face position detector circuit.

FIG. 3 is a diagram explaining the operation of the face position detector circuit 14. The face position detector circuit 14 is designed to execute the following processes.

(a) Face position detection process based on chrominance discrimination techniques (see process 23 and image data 24 in FIG. 3)
(b) Face position detection process based on interframe differences (see process 25 and image data 26)
(c) Process of determining the face position according to the results of the preceding two processes (see image data 27 and 28)

In FIG. 3, a source picture 21 is captured by the camera 11 and stored in the frame memory 12. To reduce the computation time for the above processes (a)–(c), the face position detector circuit 14 processes not all the pixels contained in the source picture 21 but only a limited number of pixels sampled at predetermined pixel intervals (see sampling grids 22). The data sampling operation is performed in advance to the above three processes, i.e., before the picture data reaches the face position detector circuit 14, and the sampled image is stored in the subsampled frame memory 13.

Here, the pixel position is defined in a two-dimensional coordinate system with the origin located at the top-left corner of the source picture 21. The sampled image $Qi,j(n)$ is given by $$Qi,j(n) = Psx \cdot i, sy \cdot j \tag{1}$$

where $Px,y$ is a pixel data array representing the source picture 21, n is a frame sequence number, sx is the X-axis grid interval, sy is the Y-axis grid interval. Note that the source picture 21 is a full-color image, and thus the values of $Px,y$ and $Qi,j$ are expressed in the form of three-dimensional vectors according to the RGB or Y/C color space representation.

Using the sampled pixel data array, or the sampled image $Qi,j(n)$ defined at the sampling grids 22, the face position detector circuit 14 performs a face position detection process based on some chrominance discrimination techniques. More specifically, the face position detector circuit 14 uses Equation (2) in the process 23 to calculate a chrominance index image $Eci,j$.

$$Eci, j(n) = \underset{k=0 \ldots Nd}{\mathrm{MAX}} \frac{W(k)}{|Qi, j(n) - Dc(k)| + 1} \tag{2}$$

This chrominance index image $Eci,j$ shows an image processed in a color metric space that is defined in terms of differences between the sampled pixel data $Qi,j(n)$ and a certain chrominance reference value $Dc(k)$. The chrominance reference value $Dc(k)$ is registered as one of the entries in a standard facial color dictionary. Particularly, in Equation (2), $Dc(k)$ is given as a k-th standard value for a predetermined facial skin color. Nd is the number of standard values, and $W(k)$ is a k-th weighting coefficient based on the deviation for each standard value of facial color. The symbol "| . . . |" is used to express the absolute value of $Qi,j(n)-Dc(k)$.

The data 24 in FIG. 3 shows the chrominance index image $Eci,j$ obtained in this way. Here, larger black dots represent such pixels that exhibit relatively larger chrominance index values $Eci,j$, implying that those pixels match with some of the standard facial colors registered in the dictionary.

In reality, the color fidelity of the camera 11 is not always good, and thus the source pictures captured by such a camera may be biased to some specific color. Further, the source pictures are likely to be affected by the lighting in the conference room. Taking those factors into consideration, the chrominance index image $Eci,j$ can alternately be calculated by replacing $Qi,j$ with $Q'i,j$ that is expressed as $$Q'i,j = Qi,j - Sc \tag{3}$$

Here, Sc is a chrominance offset actually representing the average color value of a source picture, which is obtained by $$Sc = \frac{\sum_{i=0}^{Nx-1} \sum_{j=0}^{Ny-1} Qi, j}{Nx \cdot Ny} \tag{4}$$

The face position detector circuit 14 then executes a face position detection process (process 25 in FIG. 3) based on interframe differences by using the sampled pixel values $Qi,j(n)$. That is, another index image $Emi,j$ representing interframe differences, or motion, is obtained by $$Emi,j(n) = |Qi,j(n) - Qi,j(n-1) + a1 \cdot Emi,j(n-1) \tag{5}$$

where a1 is a constant.

The image data 26 in FIG. 3 shows this motion index image $Emi,j$ obtained in the face position detection process. Here, larger black dots indicate such pixels that exhibit relatively larger motion index values, implying that those pixels are likely to represent a participant's image.

Then Equation (6) yields a chrominance-motion combined index image Ei,j that is used to evaluate totally the picture in process to detect the face position, based on the above-described chrominance index image Eci,j and motion index image Emi,j.

$$Ei,j = Ac \cdot Eci,j + Am \cdot Emi,j \qquad (6)$$

where Ac and Am are weighting coefficients for linear combination of the two index images, Eci,j and Emi,j.

It should be noted here that the motion index image Emi,j is likely to exhibit large pixel values at the edge of the face and small values in the central part thereof because the calculation of EMi,j essentially contains differential operations. To avoid such an effect in the Emi,j calculation and make the face position detection stable, it is desirable for the variation of the motion index image Emi,j to be smoothed. The following Equation (7) adds some blur to the motion index image Emi,j, thus modifying the combined index image Ei,j as $$Ei, j = Ac \cdot Eci, j + \sum_{x=-1}^{1} \sum_{y=-1}^{1} Am(x, y) \cdot Emj + x, j + y \qquad (7)$$

where Am(i,j) is a set of weighting coefficients for weighting the motion index values in the vicinity of each pixel of interest. More specifically, this Am(i,j) is defined to be Gaussian or pyramidal weighting coefficients.

The combined index value Ei,j for each pixel is calculated in this way, and based on the values of Ei,j of the entire picture, the face position detector circuit 14 finally detects the face position. That is, as the image data 27 in FIG. 3 shows, the face position detector circuit 14 selects a set of pixels out of the pixels at all sampling grids, according to the condition as $$Ei,j > THf \qquad (8)$$

where THf is a predetermined threshold for the face position detection. The pixels satisfying this criterion (8) are registered as candidate pixels for face detection.

The candidate pixels are classified into several groups through a clustering process that uses the candidate pixel coordinates as a parameter or through a histogram-based grouping process. The face position and face size are finally reached by calculating a rectangle circumscribing each group of the candidate pixels as illustrated in the image data 28 in FIG. 3.

Now that the face position is determined through the above process, the facial color is sampled from the relevant pixels for use in the same face position detection process to be repeatedly executed for later frames. This facial color sampling will improve the accuracy of the face position detection.

Figure 4:
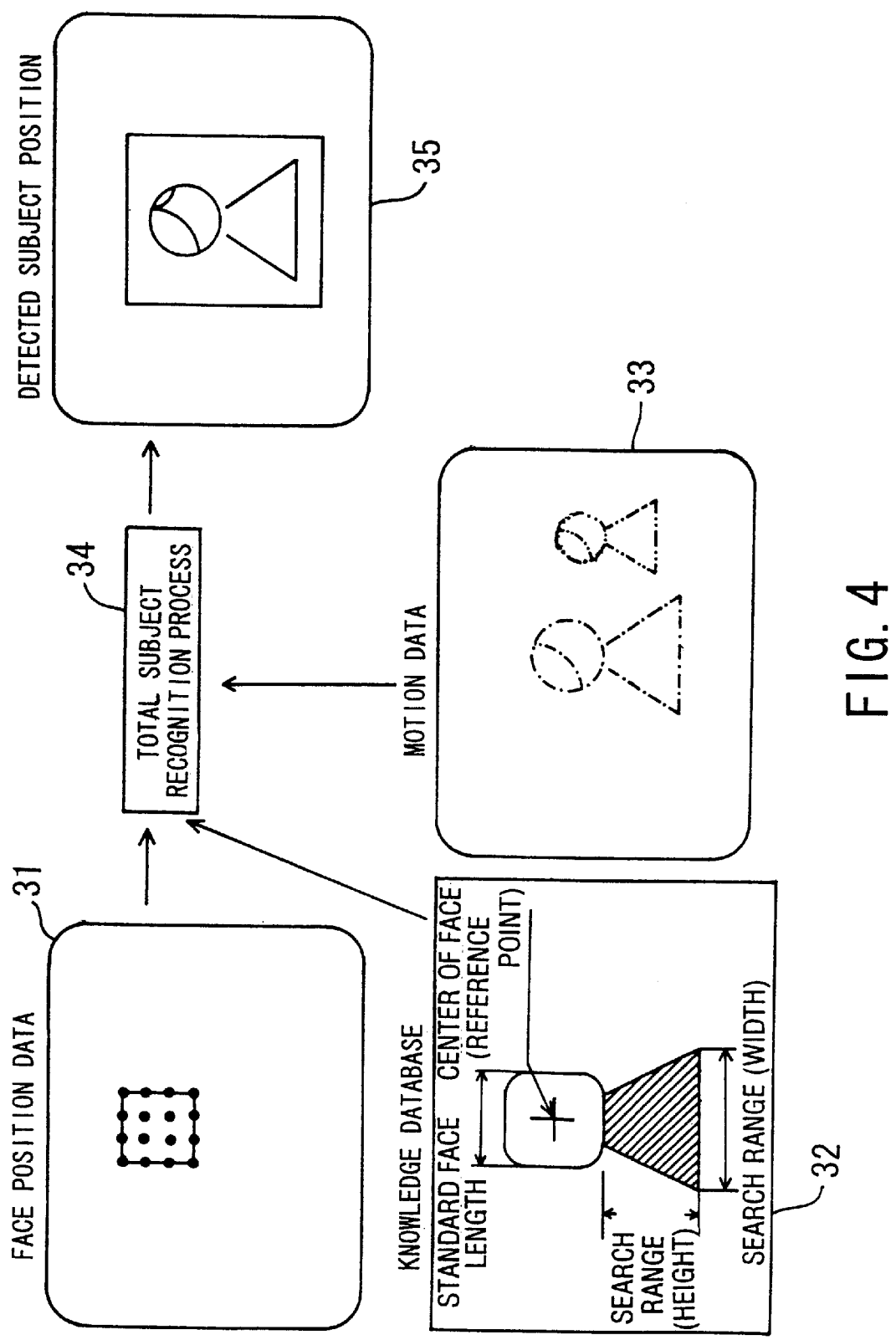
FIG. 4 is a diagram showing the operation of a participant position detector circuit.

FIG. 4 is a diagram showing the operation of the participant position detector circuit 15. The participant position detector circuit 15 receives information on the participant's motion (data 26 in FIG. 3) and information on the determined face position (data 28 in FIG. 3) from the face position detector circuit 14. In FIG. 4, those two kinds of data are represented as face position data 31 and extracted motion data 33. The participant position detector circuit 15 has a knowledge database 32 for storing information on the body shape of each person in the form of a set of various coordinate values measured with respect to his/her face position. Using the received data 31 and 33 and the knowledge database 32, the participant position detector circuit 15 conducts a total subject recognition process 34.

Each piece of the body shape information stored in the knowledge database 32 is structured as a set of relative coordinate values with respect to the center of the face. Alternately, those relative coordinate values can be defined by several equations and coefficients to evaluate the source picture and determine the participant positions.

More specifically, each set of relative coordinate values will be defined, in the knowledge database 32, by using either of the following three different models (a)–(c) to approximate the shape of a body.

(a) Triangle Approximation Model

The origin of the relative coordinate system is set to the center of the face. Then the body is represented as a closed area that satisfies the following three inequality conditions (9a)–(9c).

$$y < a0 \cdot x \qquad (9a)$$

$$y < a1 \cdot x \qquad (9b)$$

$$b0 < y < 0 \ (b0 < 0) \qquad (9c)$$

where a0, a1, and b0 are constant values. Considering this area as being most likely to include the image of a participant's body, the participant position detector circuit 15 searches the data 33 within the area for a particular position where the motion index values Emi,j are maximized.

(b) Rectangle Approximation Model

The origin of the relative coordinate system is set to the center of the face. Then the body is represented as a closed area that satisfies the following two inequality conditions (10a) and (10b).

$$a0 < x < a1 \ (a0 < a1) \qquad (10a)$$

$$b0 < y < 0 \ (b0 < 0) \qquad (10b)$$

where a0, a1, and b0 are constant values. Considering this area as being most likely to include the image of a participant's body, the participant position detector circuit 15 searches the data 33 for a particular position within that limited area at which the motion index values Emi,j are maximized.

(c) Weighted Triangle Approximation Model

In this approximation model, a weighting coefficient Cb is first calculated as $$Cb = A \cdot a0 + B \qquad (11)$$

where A and B are constants. The value a0 is expressed as $$a0 = |\tan^{31} {}^{1}((y-yf)/(x-xf))| \qquad (12)$$

where xf and yf are the center coordinates of the face.

Next, by using the weighting coefficient Cb obtained in that way, a weighted motion index image E'mi,j is calculated as $$E'mi,j = Cb \cdot Emi,j \qquad (13)$$

Through examination of such E'mi,j values, the pixels satisfying the following condition (14) will be extracted as the pixels representing the subject's body.

$$E'mi,j > THb \qquad (14)$$

where THb is a threshold that is predetermined for subject body recognition purposes.

The use of the weighted motion index image E'mi,j as a key parameter in the subject body recognition process will enable the process to be more stable and robust.

With respect to the first two models (a) and (b), the following condition (15) is examined so as to extract the pixels that represent the subject body.

$$Emi,j > THb(i,j \in (a) \text{ or } (b)) \quad (15)$$

That is, in the case of (a) or (b), the pixels having Emi,j values larger than the threshold THb are extracted from among those considered to be most likely to include the image of the subject body.

As such, the subject body is recognized by extracting the pixels satisfying the condition (14) or (15). Finally, the participant position detector circuit 15 yields the participant position by defining a rectangle that is circumscribed about both face and body of the subject, or the participant. The participant position detector circuit 15 then supplies the clipping position setting circuit 16 with the center position of the face, subject body position definition, head size, and circumscribed rectangle.

There are several options in the above-described subject recognition process when the result of grouping of candidate pixels indicated the presence of multiple participants. In the first option, a rectangle can be generated in such a way that it will be circumscribed about all the images of multiple participants as a whole, to allow them to be cut out as a single clip. In the second option, a single participant image with the largest face area may be chosen and subject to the next clipping process. Further, the system can be configured so that either of the above two options will be enabled by a selection switch.

Now that the subject image is successfully extracted, the clipping position setting circuit 16 determines an image clipping window as will be described below with reference FIG. 5.

Figure 5:
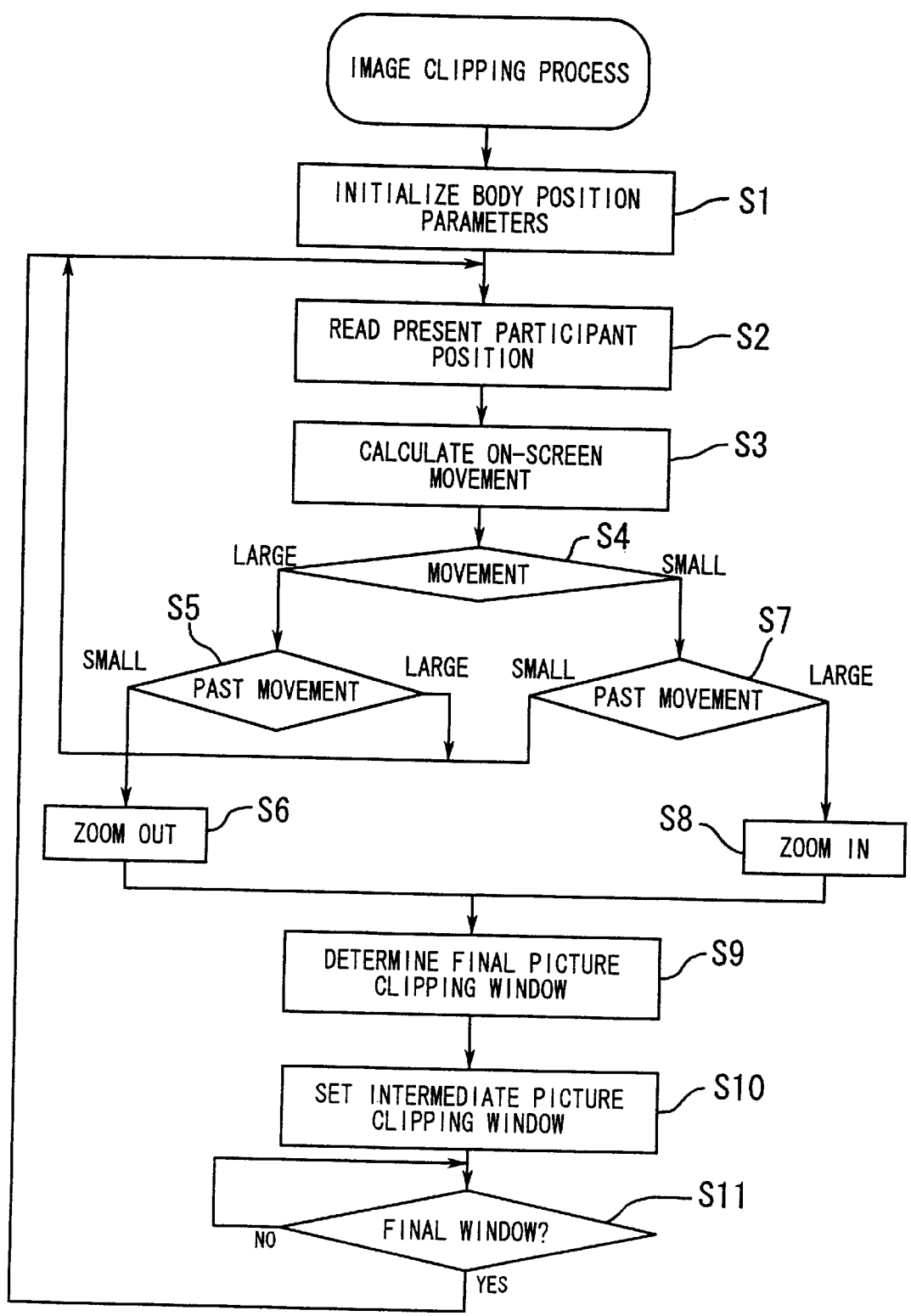
FIG. 5 is a flowchart showing a procedure for determining an image clipping position by a clipping position setting circuit.

FIG. 5 is a flowchart showing a procedure for determining an image clipping window by a clipping position setting circuit 16. The detailed procedure will now be explained below in the order of step numbers shown in FIG. 5.

[S1] Parameters pertaining to the body position are initialized, and then a cyclic execution loop is started and repeated at every frame or at every few frames. In the case that the loop is executed for each frame, the clipping position will be frequently updated. However, even a small movement of participants can easily lead to meaningless fluctuation of the clipping position, thus making the picture unacceptably unstable. Also, some external noises may cause the same problem if introduced into the system. Such problem situations can be solved by skipping some frames to take an appropriate time interval when repeating the loop.

[S2] The clipping position setting circuit 16 obtains necessary information on the present participant position from the participant position detector circuit 15 and determines the picture clipping window based on the information. While the information includes the face center position, subject body position, head size, and location of the circumscribed rectangle, the participant position detector circuit 15 uses the location information of the circumscribed rectangle to determine where to place the picture clipping window.

Figure 6:
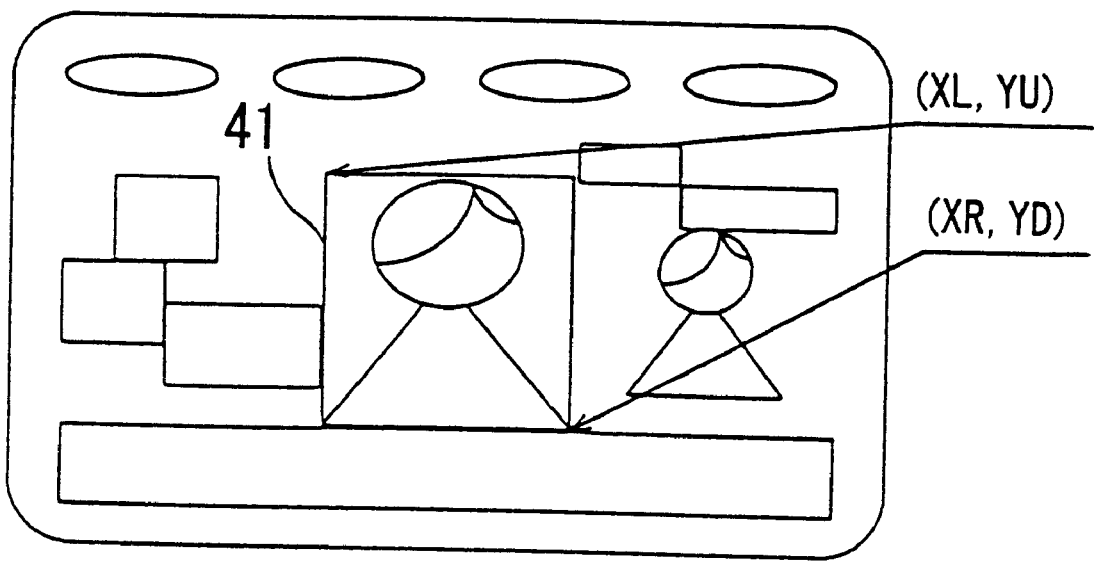
FIG. 6 is a diagram explaining a circumscribed rectangle displayed on a screen.

FIG. 6 shows a typical circumscribed rectangle 41, which is defined by two diagonal coordinates, namely, (XL,YU) for the top left-hand corner and (XR,YD) for the bottom right-hand corner. To avoid the aforementioned meaningless fluctuations in the clipping position, the clipping window must be set so that it will contain the circumscribed rectangle in a stable manner.

Consider that the desired picture clipping window is defined by two diagonal coordinates, namely, (SL,SU) for the top left-hand corner and (SR,SD) for the bottom right-hand corner. Those coordinates will be obtained in the following way.

First, the coordinate values XL, XR, YU, and YD of the circumscribed rectangle 41 are subjected to median filters as defined by Equations (16a), (16b), (16c), and (16d), respectively.

$$SL' = \left( \underset{i=0,Na,Nb}{\text{MID}} XL(n-i) \right) \quad (16a)$$

$$SR' = \left( \underset{i=0,Na,Nb}{\text{MID}} XR(n-i) \right) \quad (16b)$$

$$SU' = \left( \underset{i=0,Na,Nb}{\text{MID}} YU(n-i) \right) \quad (16c)$$

$$SD' = \left( \underset{i=0,Na,Nb}{\text{MID}} YD(n-i) \right) \quad (16d)$$

where MID represents median filtering, Na is the number of median filters, and Nb is the number of medium values, or medians. Based on the filtered output values SL', SR', SU', and SD', the desired coordinate values SL, SR, SU, and SD are obtained as $$SL = \underset{i=0,Nc}{\text{MIN}}(SL') \quad (17a)$$

$$SR = \underset{i=0,Nc}{\text{MAX}}(SR') \quad (17b)$$

$$SU = \underset{i=0,Nc}{\text{MIN}}(SU') \quad (17c)$$

$$SD = \underset{i=0,Nc}{\text{MAX}}(SD') \quad (17b)$$

where MIN and MAX represent operators to yield the minimum and maximum values, respectively, and Nc is the total number of samples (i.e., values of SL', SR', SU', and SD' in consecutive frames) which are subjected to the MIN and MAX operations.

[S3] Based on the face center position, subject body position, etc. received from the participant position detector circuit 15, the clipping position setting circuit 16 calculates the on-screen movement of the subject observed in a predetermined time.

[S4] The observed movement is compared with a predefined threshold. If the movement is larger than the threshold, the process advances to step S5. If, in turn, the movement is smaller than the threshold, the process proceeds to step S7.

[S5] The movement observed in the previous cycle is compared with the threshold. If the previous movement value is larger than the threshold, the process returns to step S2. If the previous movement value is smaller than the threshold, the process proceeds to step S6.

[S6] Since the previous movement was found to be small, the present picture clipping window must be small. In such a situation, the present subject image with a large movement may go out of the present clipping window. To keep the subject image within the monitor screen, the picture clipping window will be enlarged according to the magnitude of the subject movement. It should be noted here that the system will not attempt to keep track of the subject by panning the picture clipping window, but will adjust the size of the window so as to bring a zoom-out effect on the monitor screen.

[S7] The movement observed in the previous cycle is compared with the threshold. If the previous movement value is smaller than the threshold, the process returns to step S2. If the previous movement value is larger than the threshold, the process advances to step S8.

[S8] Since the previous movement was found to be large, the present picture clipping window must be large, and the subject image must look small in the monitor screen. The test performed in step S7 has indicated that the present subject image exhibits only a small movement. Such a situation implies that the subject (i.e., participant) has become inactive. Then the clipping position setting circuit 16 will make the picture clipping window smaller in accordance with the magnitude of the subject movement. It should be noted here that the system will adjust the size of the window so as to obtain a zoom-in effect on the screen.

[S9] According to the result of step S6 or S8, the clipping position setting circuit 16 finalizes the definition of the picture clipping window.

[S10] Intermediate picture clipping windows are determined by interpolation between the present window and the new window obtained in step S9. These intermediate clipping windows are necessary because an intensive change in the clipping window would cause a sudden increase in the amount of coded frame data produced by the image compression circuit 20 (FIG. 2). To prevent any problem from happening due to such data increase, a plurality of intermediate clipping windows have to be generated.

[S11] The clipping position setting circuit 16 outputs one of the intermediate picture clipping windows to enable the subject image to be cut out. If this intermediate window was the final one (i.e., the present intermediate window matches with what was calculated in step S9), then the process returns to step S2 to repeat the major loop. Otherwise, the process returns to step S10 for outputting the next intermediate clipping window.

Figure 7:
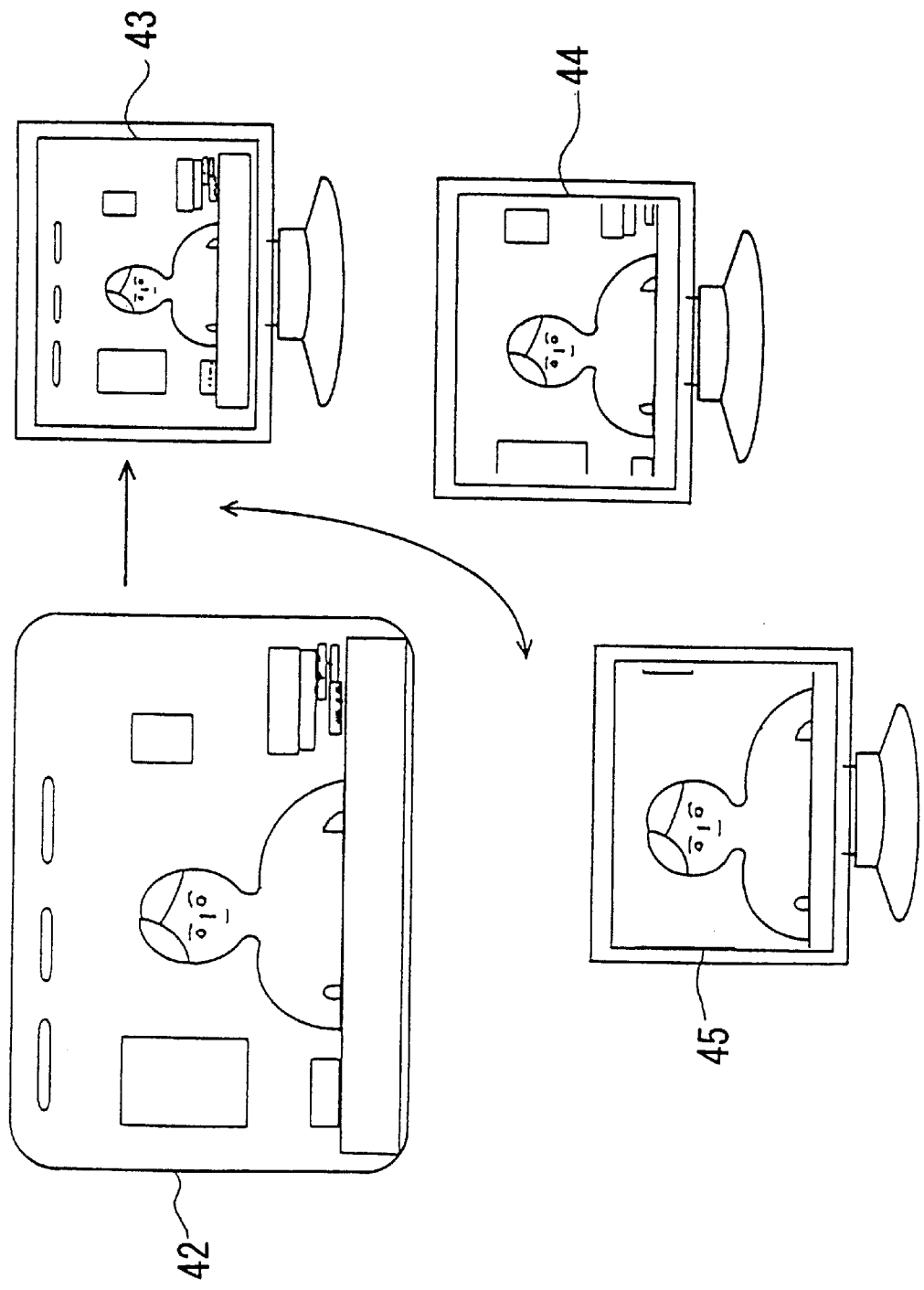
FIG. 7 is a diagram showing some typical screen shots which are reproduced at a receiving end by decoding a coded video signal received from a sending end.

FIG. 7 shows some typical screen shots which are reproduced at the receiving end by decoding a coded video signal sent from the sending end. Assume that the camera 11 is set up in such a way that a source picture 42 is captured as illustrated in FIG. 7. In the beginning of video communication, the picture is controlled so that the participants at the receiving end will see it in a long shot as depicted in a screen shot 43, which presents the entire information captured at the sending end. When the person seen in the source picture 42 does not move very much and the subject image is stable, the display control system will reduce the size of the picture clipping window, thereby yielding a zoomed-in shot 44. When the subject image is still kept stable, the system will further shrink the picture clipping window, thereby providing a further zoomed-in shot 45.

As such, the picture will be gradually varied from the initial long shot 43 to the middle shot 44 and then to the fully zoomed shot 45. This transition should be performed at an adequate speed, and its smoothness level must be high enough for the viewers to feel it natural.

On the other hand, when the subject person in the zoomed-in shot 45 moved, the system will enlarge the picture clipping window to keep the subject image displayed within the screen. As a result, the picture displayed at the receiving end may change from the zoomed shot 45 back to the medium shot 44 and further to the long shot 43.

As described above, the present invention first locates the face position of a participant by using facial color and motion information and then detects the body position based on the face position. In this process of body position detection, a certain search area is determined by using the face position as the reference point. The body position is then calculated by examining motion observed in the search area. Therefore, the system can reliably extract the participant's image even if something is moving on the background. Further, when the subject is moving, the system does not attempt to keep track of the subject but will adjust the size of the clipping window so as to yield a zoom-out effect on the screen. In this way, the present invention provides an improved display control system for videoconferencing.

Referring next to FIGS. 8–19, a second embodiment of the present invention will be explained below.

Figure 8:
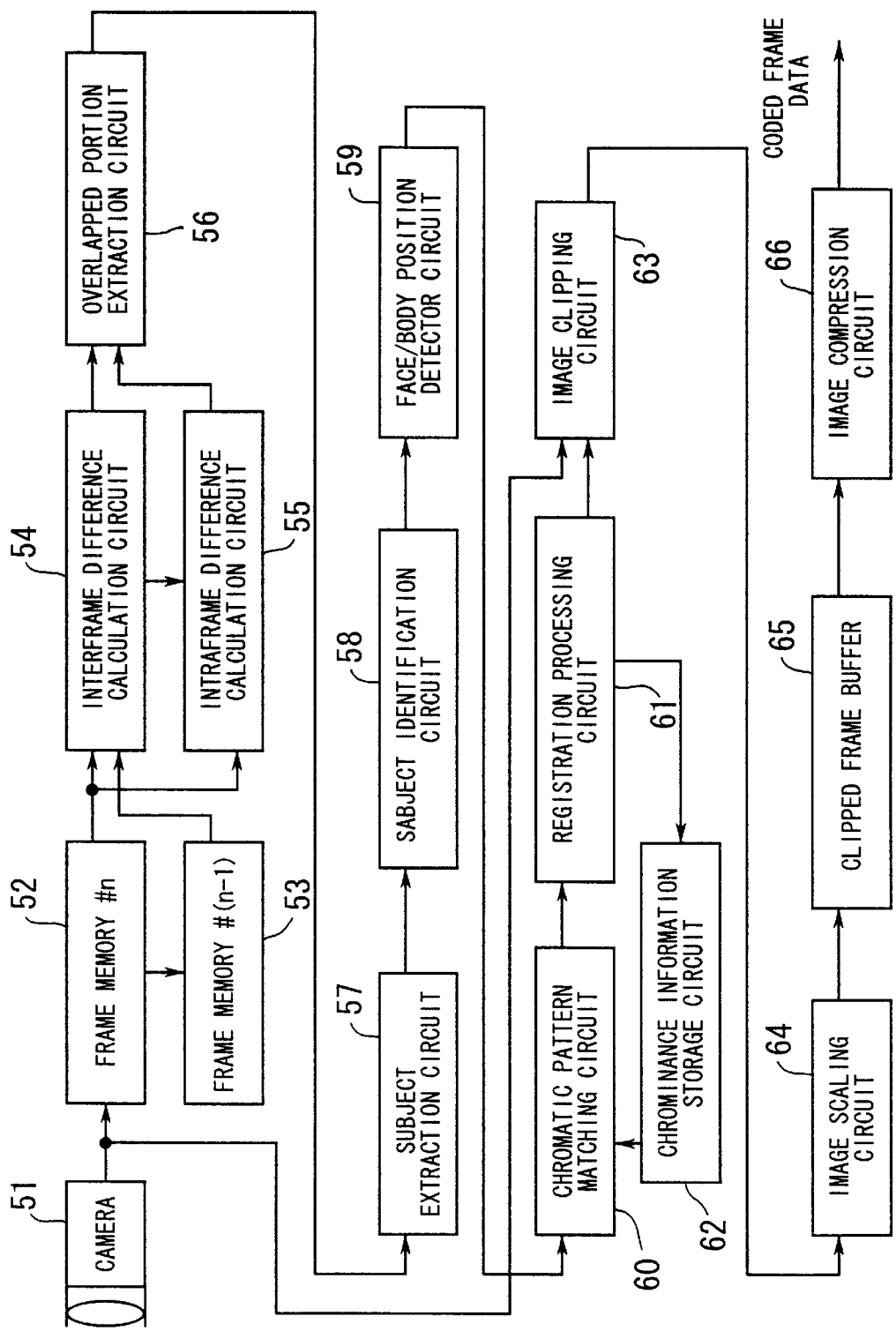
FIG. 8 is a block diagram showing the structure of a second embodiment of the present invention.

FIG. 8 is a block diagram showing the second embodiment of the present invention. A camera 51 captures the overall view of the conference room including participants gathered therein. The captured picture is sent, in the form of RBG or YUV video signals, to a frame memory 52 for storage. This camera 51 is a wide-angle high-resolution color video camera that is capable of capturing pictures of a wide spatial range with high definition. Note that the camera 51 is equipped with no zooming or panning mechanisms but placed at a predetermined position in a fixed orientation.

In the system of FIG. 8, there is provided another frame memory 53 coupled to the first-mentioned frame memory 52. Recall that the video signal is provided as a sequence of frames. When the present frame, or frame #n, is supplied to the frame memory 52, the previous frame, or frame #(n−1), stored in the frame memory 52 is transferred to the second frame memory 53. As a result, the frame memory 52 always holds the present frame #n, and the frame memory 53 the previous frame #(n−1).

An interframe difference calculation circuit 54 retrieves both the present and previous frames from the above-described two frame memories 52 and 53 and calculates their differences. Further, the interframe difference calculation circuit 54 calculates the average difference value $\epsilon$inter over the entire frame image. Using the calculated average difference $\epsilon$inter as a threshold, the interframe difference calculation circuit 54 digitizes the interframe differences. The resultant two-dimensional binary image is referred to as the motion image Mx,y.

On the other hand, an intraframe difference calculation circuit 55 retrieves the present frame from the frame memory 52 and calculates the intraframe differences. The intraframe difference calculation circuit 55 then calculates the average difference value $\epsilon$intra over the entire frame image. Using this average difference $\epsilon$intra as a threshold, the intraframe difference calculation circuit 55 digitizes the intraframe differences. The resultant two-dimensional binary image is referred to as the edge detection image Ex,y.

The motion image Mx,y and edge detection image Ex,y are then supplied to an overlapped portion extraction circuit 56. The overlapped portion extraction circuit 56 extracts the pixels that are found in both images Mx,y and Ex,y. Those extracted pixels will form another image, which is referred to as the active edge image MEx,y. This active edge image MEx,y is very informative because it is likely to show the present locations of participants in a conference.

With the active edge image MEx,y, a subject extraction circuit 57 identifies particular areas that are most likely to contain the images of participants. Then a subject identification circuit 58 evaluates the shape of each extracted area to determine whether or not the shape matches with some typical outline images of human bodies. If the extracted area is recognized as human images, a face/body position detector circuit 59 determines the face and body positions, based on the shape of the image area extracted by the subject extraction circuit 57.

A chrominance information storage circuit 62 holds various facial color patterns extracted from the participants' images in the past frame processes. A chromatic pattern matching circuit 60 samples a facial color pattern at the face position of the present frame which is detected by the face/body position detector circuit 59. The chromatic pattern matching circuit 60 then compares the sampled color pattern with the facial color patterns stored in the chrominance information storage circuit 62. Through this color pattern matching process, the image areas extracted by the subject extraction circuit 57 are further qualified as the human images. Based on the result of such qualification, a registration processing circuit 61 stores the color pattern sample extracted from the present frame into the chrominance information storage circuit 62.

Out of the source picture captured by the camera 51, an image clipping circuit 63 cuts a picture as specified in a predetermined clipping processing mode. An image scaling circuit 64 enlarges or shrinks the clipped picture so that it will fit to the monitor screen, and then stores the picture into a clipped frame buffer 65.

An image compression circuit 66 retrieves the pictures from the clipped frame buffer 65 and encodes them by using video compression techniques such as the ITU-T videoconferencing standards H.261. The coded frame data is transmitted to the distant end.

Figure 9:
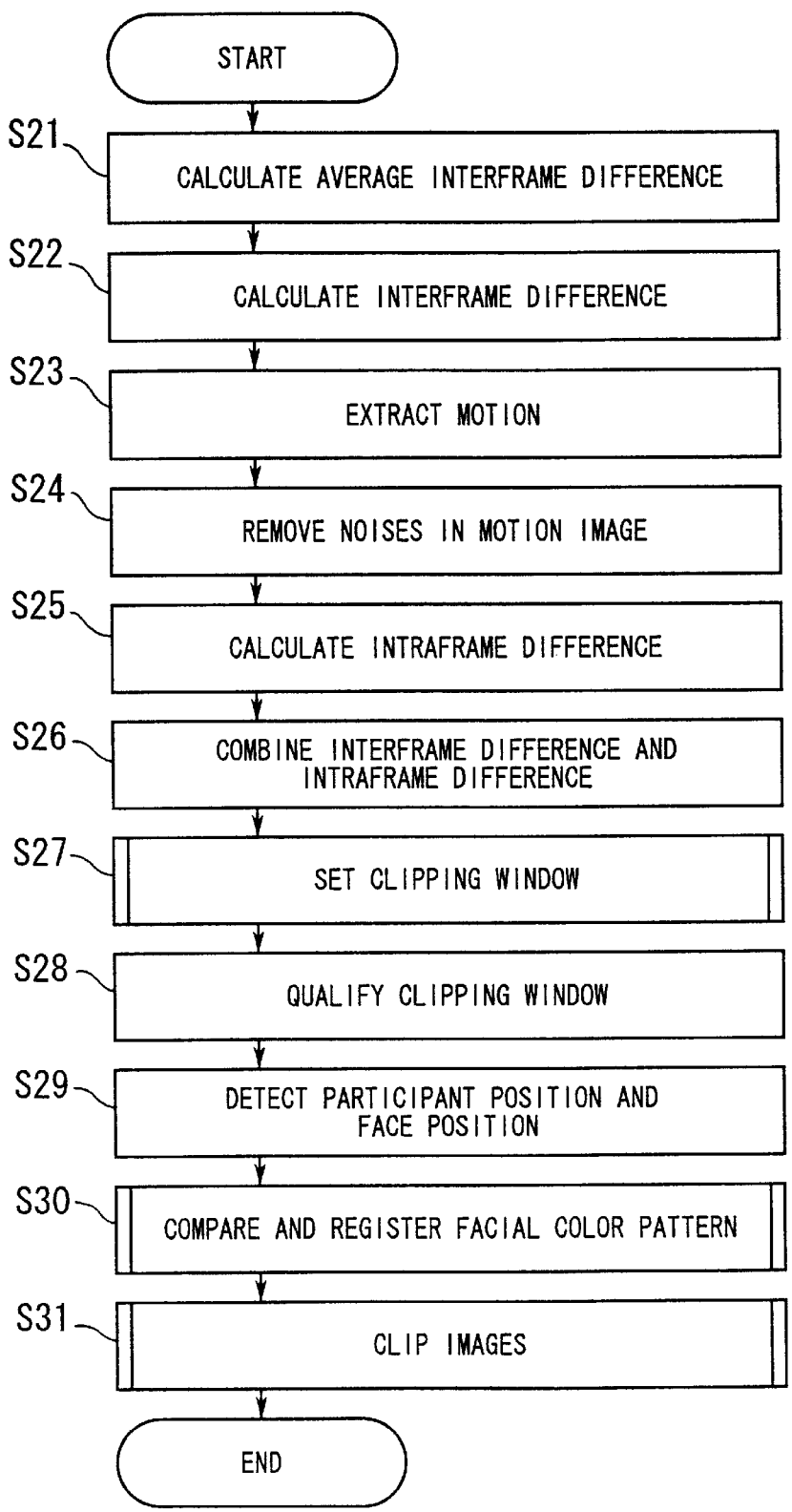
FIG. 9 is a flowchart showing how the display control system operates in the second embodiment.

Referring next to FIG. 9, the operation of the above-described circuits will be described in further detail.

FIG. 9 is a flowchart showing how the system operates in the second embodiment. The process of FIG. 9 is initiated each time the camera 51 supplies a new frame picture to the system. The explanation will be presented according to the order of the step numbers shown in FIG. 9.

[S21] The interframe difference calculation circuit 54 reads pixel values Pn,x,y of the present frame #n from the frame memory 52, as well as retrieving pixel values Pn−1,x,y of the previous frame #(n−1) from the frame memory 53. Here, x and y represent the x- and y-axis coordinate values of each pixel within a frame. The average value εinter of the interframe differences is calculated as $$\varepsilon inter = \frac{1}{N} \sum_{for\_all\_pixels} |Pn, x, y - Pn - 1, x, y| \quad (18)$$

where N is the total number of pixels in a frame.

[S22] With the pixel values Pn,x,y and Pn−1,x,y, the interframe difference calculation circuit 54 calculates the interframe difference value Dn as $$Dn=|Pn,x,y-Pn-1,x,y| \quad (19)$$

[S23] The interframe difference calculation circuit 54 assigns a value "1" to the pixels satisfying Equation (20), while assigning a value "0" to the other pixels. Here, the value "1" indicates active pixels and the value "0" stationary pixels. Such pixels will form a two-dimensional binary motion image Mx,y.

$$Dn>THmov \quad (20)$$

where THmov is a threshold value determined by Equation (21).

$$THmov=\alpha mov \cdot \varepsilon inter \quad (21)$$

where αmov is a constant. When this constant αmov is given a large value, the pixels exhibiting larger motion values will gain the value "1" as being regarded as the active pixels. When in turn the constant αmov is given a small value, more pixels will gain the value "1" even though their motion values are actually small. However, such small αmov values may allow some unwanted noises to be introduced into the motion image Mx,y.

The involvement of the average value εinter in the threshold value THmov will bring some benefits. First, some stationary noises caused by the camera 51 can be removed from the source pictures. Second, it will increase the robustness of the interframe difference calculation against flickers of external light sources which may cause a shift or fluctuation of the DC level of the source pictures.

[S24] Small noises contained in the motion image Mx,y are rejected by the interframe difference calculation circuit 54. That is, it finds one or two adjacent pixels that are one-valued (i.e., having a binary value "1") but are isolated in the surrounding zero-valued (i.e., having a binary value "0") pixels. The interframe difference calculation circuit 54 will change the values of such pixels to "0." Likewise, one or two adjacent zero-valued pixels will be changed to "1" if they are isolated in the surrounding one-valued pixels.

[S25] The intraframe difference calculation circuit 55 reads out the image data Pn,x,y of the present frame #n from the frame memory 52. Then it applies an intraframe difference operation to the present frame image Pn,x,y. Here, the Laplacian operation for multilevel images or the gradient edge detection algorithms can be used. After that, the intraframe difference calculation circuit 55 calculates the average pixel value εintra of the resultant intraframe difference image and digitizes that image by using the average value εintra as part of the slicing threshold, thereby yielding a two-dimensional binary image referred to as the edge detection image Ex,y.

More specifically, the intraframe difference calculation circuit 55 assigns a value "1" to the pixels satisfying Equation (22), while assigning a value "0" to the remaining pixels. Here, the value "1" indicates "on-edge" pixels and "0" "on-edge" pixels. The pixels evaluated as such will form a two-dimensional binary image Ex,y named an edge detection image. That is, $$Ex,y<THedg \quad (22)$$

where THedg is a threshold value obtained in the following Equation (23).

$$THedg=\alpha edg \cdot \varepsilon intra \quad (23)$$

When this constant αedg is given a large value, only such pixels that exhibit a steep edge, or high gradient values, will be regarded as the on-edge pixels and gain the value "1." When in turn the constant αedg is given a small value, more pixels will gain the value "1" even though their actual gradient values are low. Such smaller αedg values, however, will also allow some spurious noises to be introduced into the edge detection image Ex,y. The involvement of the average value εintra in the threshold value THedge will bring some benefits. First, some stationary noises caused by the camera 51 can be removed from the source pictures. Second, it will increase the robustness of the intraframe difference calculation against flickers of external light sources, which may cause a shift or fluctuation of the DC level of the source pictures.

Although it is not explicitly shown in the flowchart of FIG. 9, the process in step S25 actually includes a noise rejection process similar to that in step S24.

[S26] The overlapped portion extraction circuit 56 calculates an active edge image MEx,y through a bitwise logical AND operation between the motion image Mx,y and edge detection image Ex,y as $$Mex,y = Mx,y \cap Ex,y \qquad (24)$$

Figure 10:
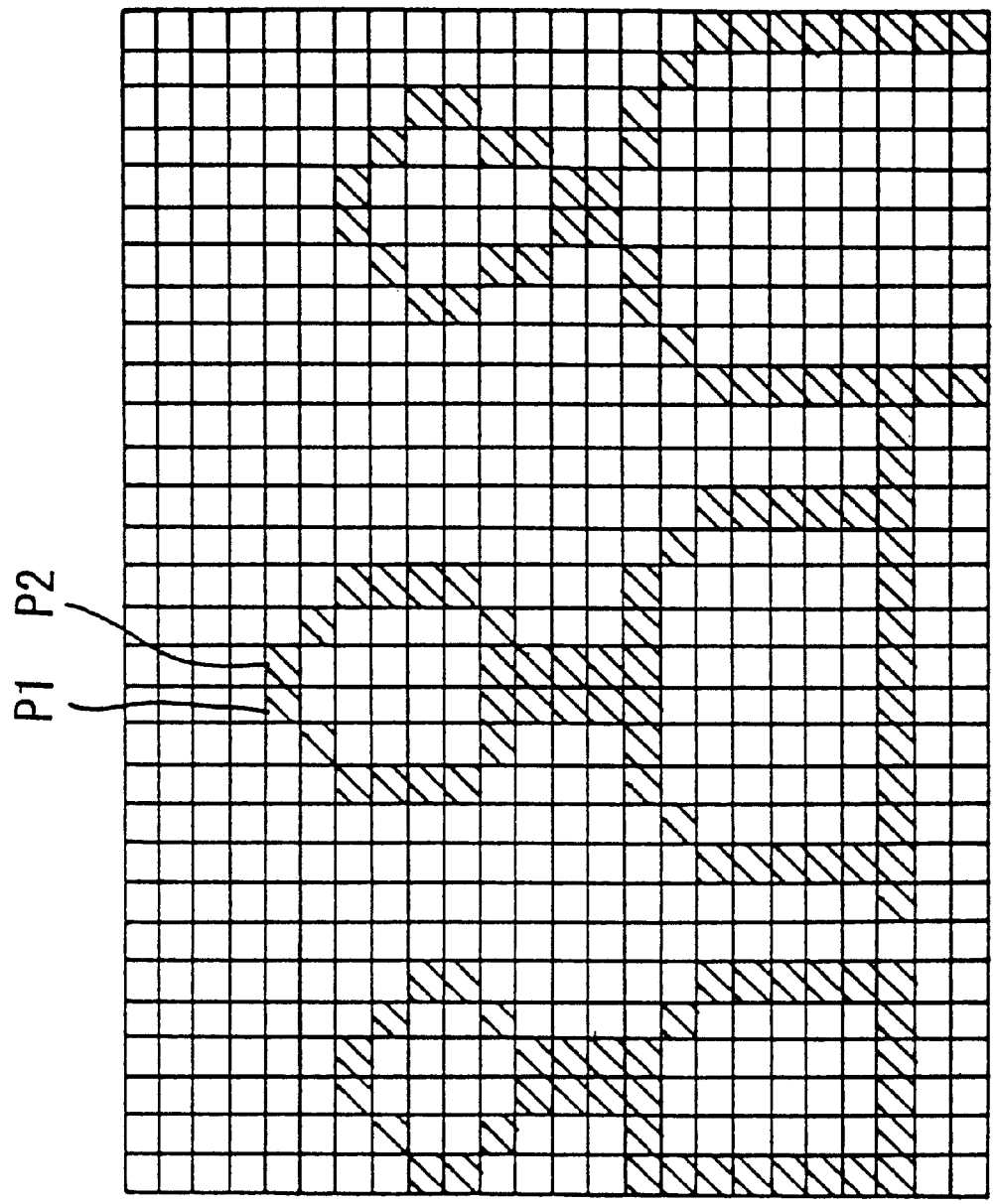
FIG. 10 is a diagram showing an example of an active edge image $ME_{x,y}$.

FIG. 10 is a diagram showing an example of such active edge image MEx,y. In FIG. 10, each small box represents a pixel of the active edge image MEx,y. Blank pixels have a value of "0," while hatched pixels have a value of "1." The hatched pixels are likely to show the edge of participant images.

Unlike the present invention, conventional videoconference systems extract a subject image solely from interframe difference images. When the frame rate is as slow as a few frame per second, a sudden and considerable motion of the subject will lead to a large difference between two consecutive frames. Consider, for example, that the subject was captured at a certain place in the previous frame, and in the present frame, the same subject is captured at a far distant place. In this case, the conventional systems will misinterpret two distant images of the same person as being two independent subjects. Such an erroneous subject recognition cannot happen in the present invention, because the spurious subject image in the previous frame will be removed by using intraframe difference information in addition to the interframe motion information.

[S27] With the active edge image MEx,y, the subject extraction circuit 57 identifies particular areas that are most likely to contain the images of participants.

Figure 11:
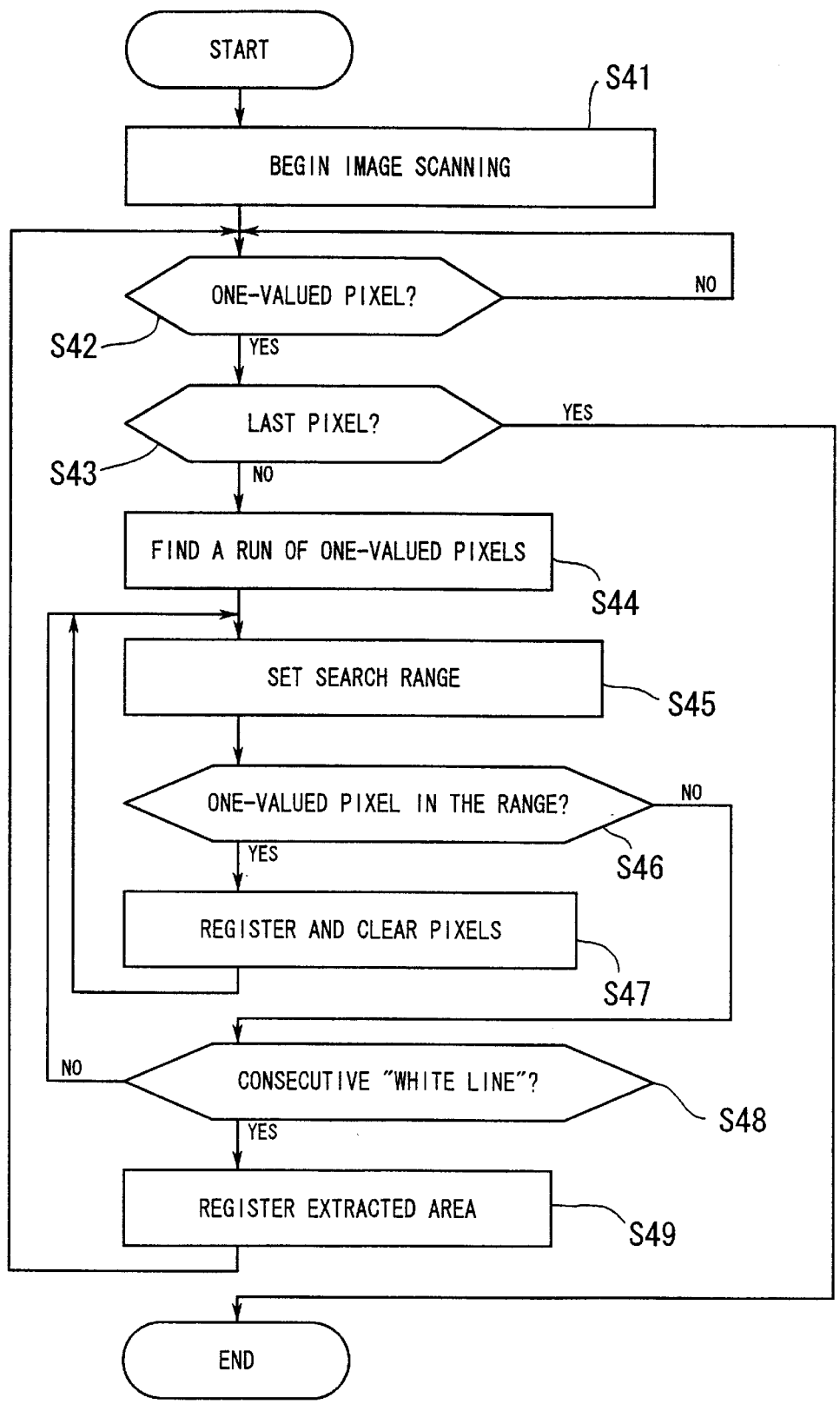
FIG. 11 is a flowchart showing the detail of step S27 as part of the flowchart of FIG. 9.

FIG. 11 is a flowchart showing the detail of step S27. Each step of this detailed flow will be explained below in the order of step numbers.

[S41] The active edge image MEx,y is examined pixel by pixel in the usual raster scan order, namely, from left to right and top to bottom.

[S42] It is determined whether the pixel under test has a value of "1" or not. If the pixel value is found to be "1," the process advance to step S43. If the pixel value is "0," the process repeats step S42 to examine the next pixel.

[S43] If the one-valued pixel is the final pixel located at the bottom right-hand corner of the image space, the process of FIG. 11 is terminated.

The above three steps will find a first one-valued pixel encountered in the scanning. For example, applying the above steps S41–S42 to the image of FIG. 10 will yield a pixel labeled p1.

[S44] With respect to each scan line where the first one-valued pixel was found, the subject extraction circuit 57 examines whether the next adjacent pixel value is "1" or not. If the pixel value is "1," then it will repeat testing of the further adjacent pixels in the same manner. This cyclic search will finally yield a group of consecutive one-valued pixels, or a run. In the image of FIG. 10, for instance, the pixels p1 and p2 form such a run.

[S45] Now that a run of one-valued pixels is detected, the subject extraction circuit 57 then defines a search range on the next scan line. This search range is positioned just below the run that was found in step S44, but it is longer than the run by a predetermined extra length.

Figure 12:
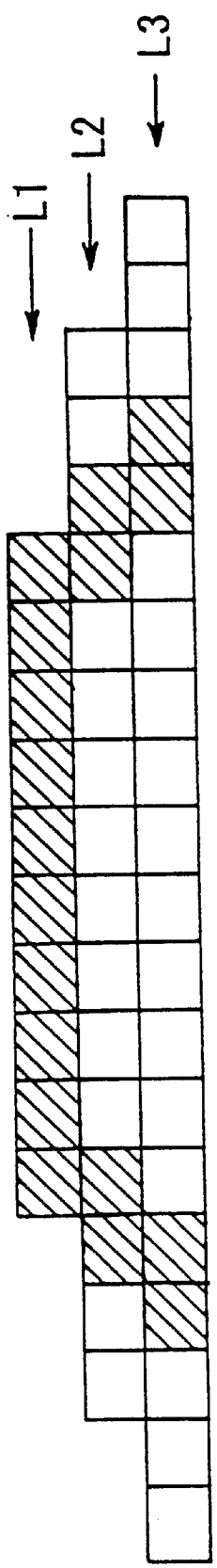
FIG. 12 is a diagram illustrating a search range.

FIG. 12 illustrates such a search range. In FIG. 12, each small box represents a pixel of the active edge image MEx,y. The blank pixels are zero-valued, while the hatched pixels are one-valued. More specifically, there is found a first run of ten pixels on the top line L1. On the second line L2, a 16-pixel long search range is established by the subject extraction circuit 57. Compared with the corresponding run lying on the line L1, the search range is defined to be three pixels longer in both directions. Likewise, the next search range is set on the third line L3 as illustrated in FIG. 12.

[S46] It is examined whether any one-valued pixel exists or not in the search range established in step S45. If such a pixel is found in the search range, the process advances to step S47. Otherwise, the process branches to step S48.

[S47] From among the pixels identified in step S46, two pixels located at both extreme ends are detected. Then a section between the detected pixels is registered as part of the subject image area, and all the pixel values within the section are cleared to zero. When the process returns to step S45, the pixels in the above-registered section will be regarded as a "run" on the present scan line. Note that, if the section on the present scan line is narrower than that one the previous scan line, the section on the previous scan line will be modified to have the same width as that on the present scan line.

[S48] When no one-valued pixel is present in the search range set in step S46, a part of the present scan line that is just below the run detected in step S44 is regarded as a "white line," which implies a series of zero-valued pixels. In this step S48, the number of such "white lines" is examined. If a predetermined number of consecutive white lines are found, the process advances to step S49. Otherwise, the process returns to step S45.

[S49] The subject image area of one participant obtained in the above-described steps S42 to S48 is registered.

Another cycle of steps S42 to S48 will yield another subject image area for a different participant. When all the participants has been identified in this manner, the process of FIG. 11 will be terminated.

Figure 13:
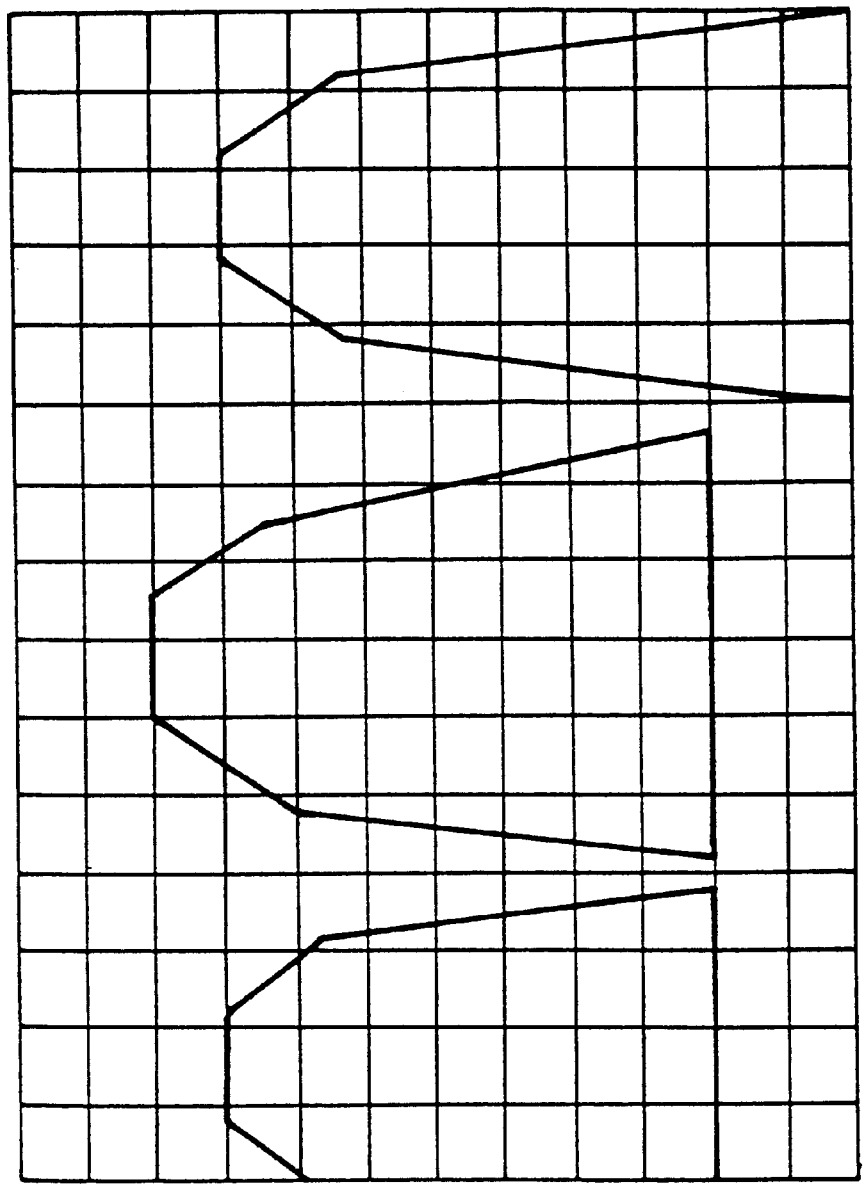
FIG. 13 is a diagram illustrating a registered subject image area.

As a result, the registered subject image areas are finally obtained as illustrated in FIG. 13. FIG. 13 shows the result of step S27 (or steps S41–S49 for details) applied to the active edge image MEx,y of FIG. 10. Note that the grid increments in FIG. 13 are not a single pixel but a plurality of pixels.

The description now resumes from step S28 of FIG. 9.

[S28] The subject identification circuit 58 confirms that each subject image identified and registered in step S49 is surely of a human body.

Figure 14:
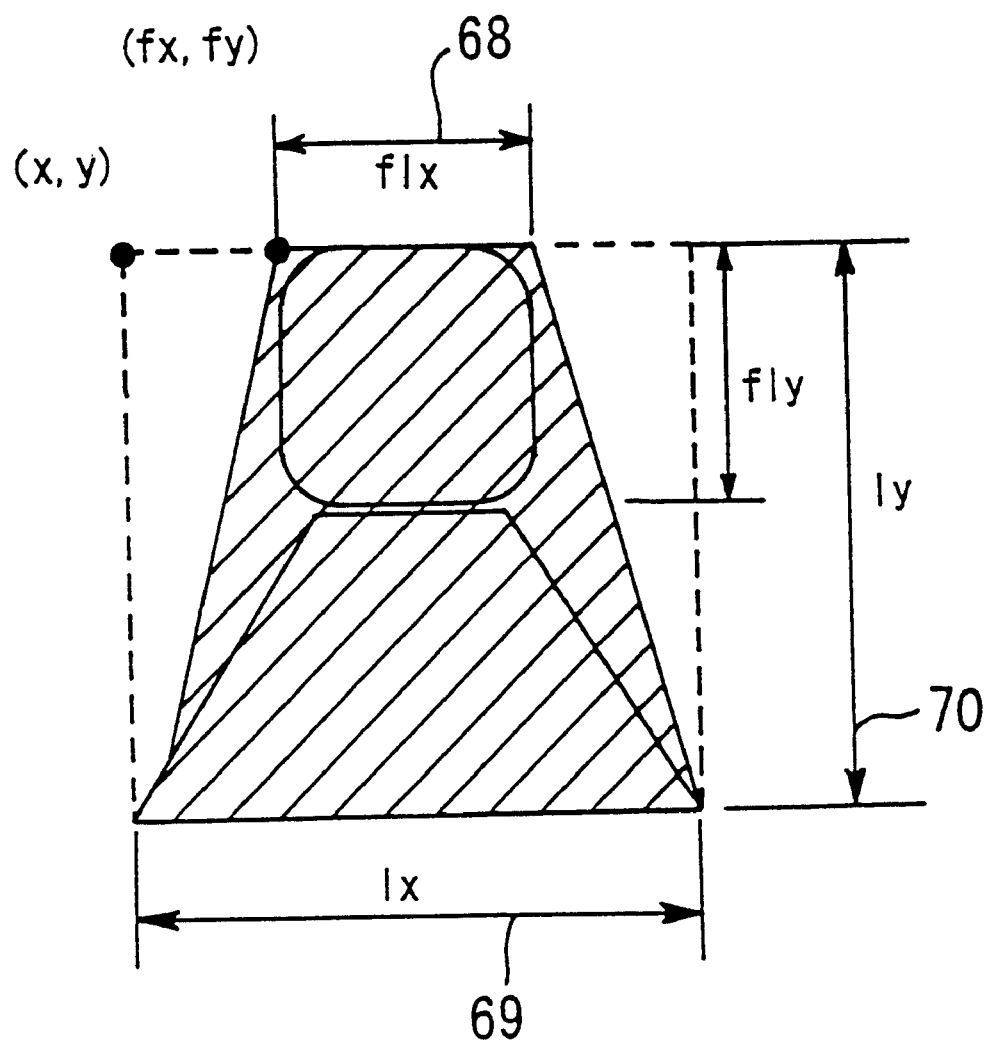
FIG. 14 is a diagram showing a subject image area representing a participant that is identified by the system.

More specifically, each identified subject image is translated into a standard model as illustrated in FIG. 14. The subject identification circuit 58 calculates (1) the ratio between the top side length (fix) 68 and bottom side length (lx) 69, and (2) the ratio between the bottom side length (lx) 69 and the body height (ly) 70. The subject identification circuit 58 tests whether the calculated ratios are within their respective predefined ranges or not. If the subject image failed in this test, the subject identification circuit 58 will simply discard

[S29] The subject images that passed the test in step S28 are applied to the face/body position detector circuit 59. For each subject image, portrait area registration data Hn is defined as $$Hn = (x, y, lx, ly, fx, fy, fix, fly) \qquad (25)$$

More specifically, a portrait rectangle is defined by the bottom side length (lx) 69 and the body height (ly) 70 as shown in FIG. 14. Also, a face rectangle is defined by the top side length (fix) 68 and the face length (fly). The face length is obtained by multiplying the top side length (fix) 68 by a predefined ratio. The point (x,y) is the top left-hand corner of the portrait rectangle, while the point (fx,fy) is the top left-hand corner of the face rectangle.

[S30] The chromatic pattern matching circuit 60 samples a facial color pattern at the face position detected by the face/body position detector circuit 59. It then compares the sampled color pattern with the facial color patterns stored in the chrominance information storage circuit 62. Through this color comparison, the subject image extracted by the subject extraction circuit 57 is further qualified as to whether it really is a human image or not. Based on the result of such qualification, the registration processing circuit 61 stores the color pattern sample extracted from the present frame into the chrominance information storage circuit 62.

Figure 15:
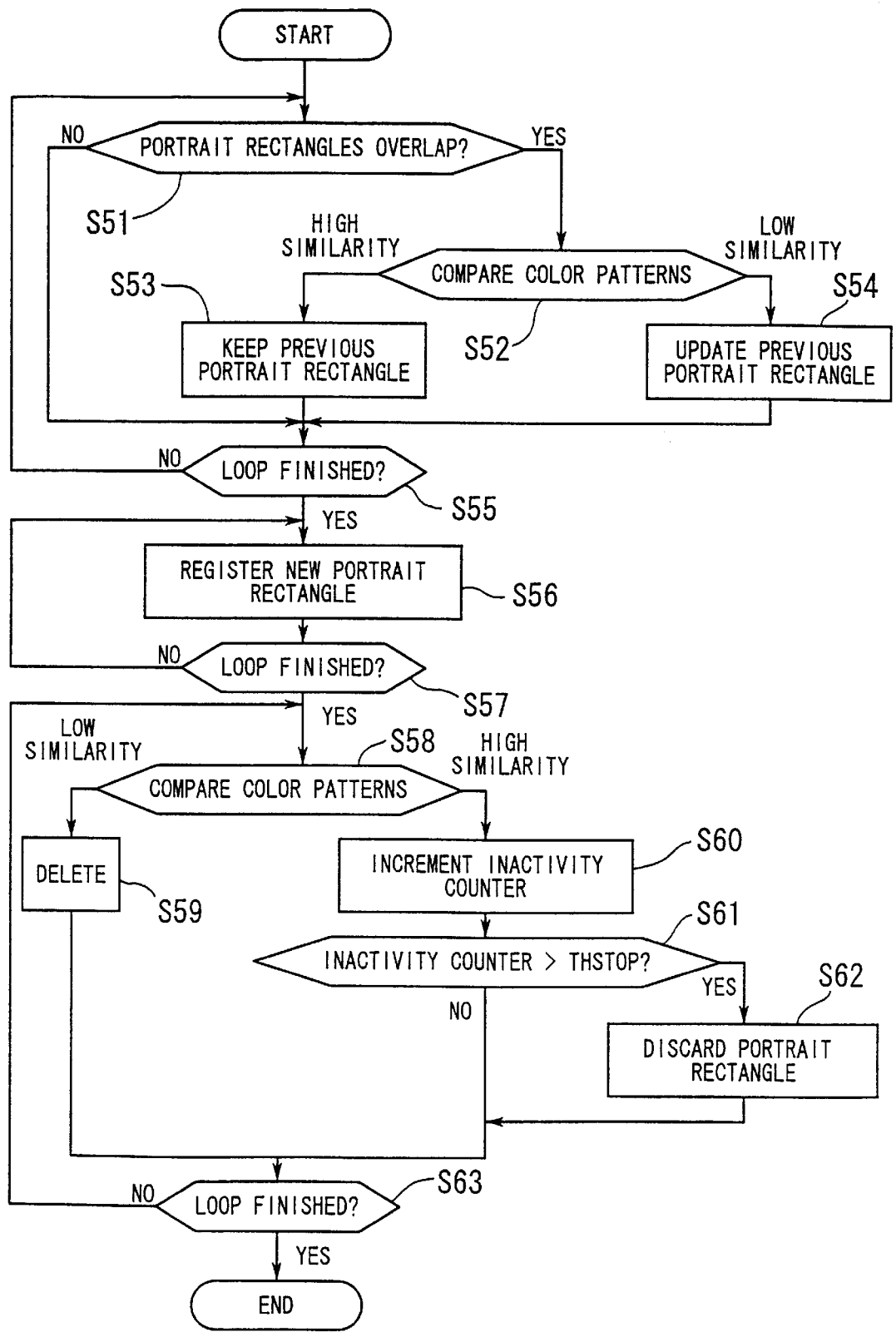
FIG. 15 is a flowchart showing the detail of step S30 as part of the flowchart of FIG. 9.

FIG. 15 is a flowchart showing the detail of this step S30. This detailed flow will be explained below in the order of the steps.

[S51] It is examined whether the present portrait rectangle overlaps with the previous portrait rectangle. If they overlap with each other, the present subject image is likely to be of the same subject, and the process then advances to step S52. In contrast, when the two portrait rectangles do not match, it means that they are likely to represent two different subjects. Then the process proceeds to step S55.

[S52] A facial color pattern sampled in the present face rectangle is compared with that of the face rectangle of the previous portrait rectangle being overlapped. If the two color patterns match with each other at a high similarity, the process advances to step S53. If the similarity is low, the process advances to step S54.

[S53] The previous color pattern stored in the chrominance information storage circuit 62 is not updated but maintained as is.

[S54] The previous color pattern stored in the chrominance information storage circuit 62 is replaced with the present color pattern.

[S55] The above-described steps S51 to S54 are applied to each portrait rectangle detected. When all portrait rectangles are finished, the process will advance to step S56.

[S56] The portrait rectangle that did not match with any previous portrait rectangles in step S51 is recognized here as a new subject entry into the picture. In step S56, a new facial color pattern is sampled and saved in the chrominance information storage circuit 62.

[S57] When there are a plurality of new entries of portrait rectangles, the above-described step S56 is repetitively applied to the plurality of portrait rectangles. When all new portrait rectangles are finished, the process will advance to step S58.

[S58] The portrait rectangles that exhibited high similarity in step S52 are examined here. In this step S58, the present facial color pattern, which is sampled from within the face rectangle, is compared with the previous color pattern. If the two patterns show a high similarity, the process advances to step S60. Otherwise, the process goes to step S59.

[S59] The portrait rectangle is discarded since it is considered to be the remainder of what were registered in step S56 as new portrait rectangles.

[S60] There are two possible interpretations. First, the subject is a real person who shows no movement. Second, the subject is not a person but a stationary object. Here, an inactivity counter is introduced to determine which interpretation is more likely. The inactivity counter actually indicates how many times the high similarities are observed in step S58.

[S61] If the value of the inactivity counter exceeds a predetermined constant THstop, the process advances to step S62.

[S62] At a high probability, the system is misinterpreting the subject image, which might actually be a background wall or the like. Therefore, the portrait rectangle will be deleted.

[S63] When there are a plurality of such portrait rectangles that exhibited high similarity in step S52, the above-described steps S58 to S62 are repetitively applied to the respective portrait rectangles. When all such portrait rectangles are finished, the process of FIG. 15 will come to an end.

The registration processing circuit 61 executes the above-described process of FIG. 15, finally outputting an image clipping window HRn expressed as $$HRn=(x, y, lx, ly, fx, fy, flx, fly) \quad (26)$$

where n=0 . . . Nm−1, and Nm is the total number of extracted portrait rectangles.

Here, the description will return to FIG. 9 again to resume from step S31.

[S31] Upon reception of the final image clipping window HRn, the image clipping circuit 63 cuts a portrait picture out of the source picture captured by the camera 51, depending on a predetermined clipping processing mode.

Figure 16:
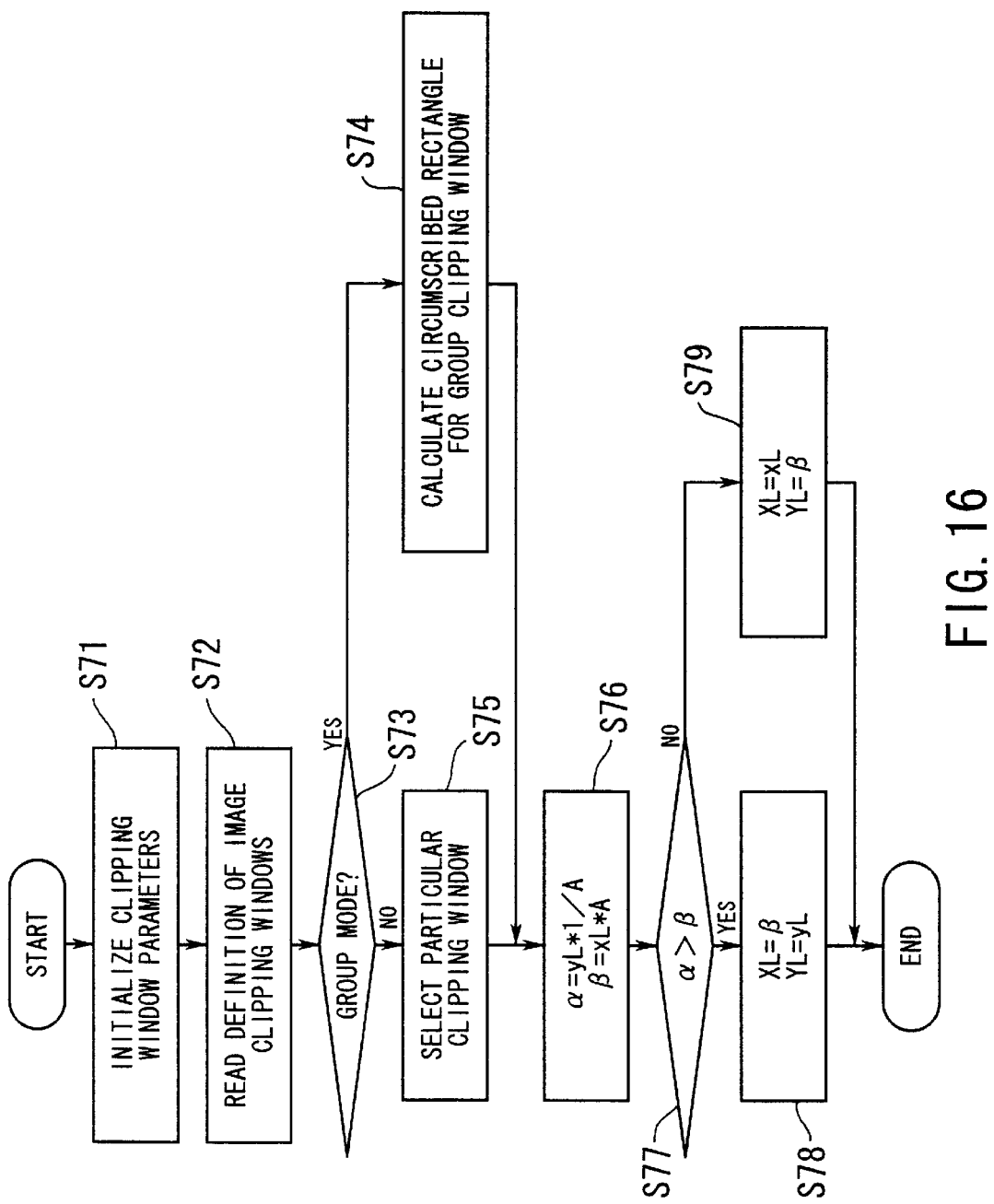
FIG. 16 is a flowchart showing the detail of step S31 as part of the flowchart of FIG. 9.

FIG. 16 is a flowchart showing the detail of step S31, which will now be explained below according to the sequence of step numbers.

[S71] The image clipping circuit 63 initializes clipping window parameters.

[S72] The image clipping circuit 63 then reads the definition of image clipping window(s) HRn.

[S73] It is examined whether the clipping processing mode is set to group mode or individual mode. If the group mode is set, the process advances to step S74. If the individual mode is set, the process advances to step S75.

[S74] The image clipping circuit 63 produces a circumscribed rectangle that covers the image clipping windows HRn for all the participants.

[S75] In the individual mode, the image clipping circuit 63 outputs an m-th image clipping window HRm corresponding to a particular participant, if specified.

[S76] The image clipping windows outputted in step S74 or S75 may not always be compatible with the monitor screen's aspect ratio. It is therefore necessary to adjust the aspect ratio of the image clipping window. This aspect ratio adjustment will be presented below with reference to FIGS. 17(A) and 17(B).

FIG. 17(A) shows the shape of an image clipping window that is originally produced, while FIG. 17(B) shows the aspect-adjusted version of the image clipping window. Here, the length parameters xL and yL indicate the horizontal and vertical lengths of the original image clipping window of FIG. 17(A). Likewise, the length parameters XL and YL indicate the horizontal and vertical lengths of the image clipping window of FIG. 17(B) after adjustment. A constant value A represents the aspect ratio of the monitor screen.

Based on Equations (27a) and (27b), two values α and β are calculated.

$$\alpha = yL/A \quad (27a)$$

$$\beta = xL \cdot A \quad (27b)$$

[S77] If the value α is larger than the value β, the process advances to step S78. Otherwise, the process goes to step S79.

[S78] The length parameters XL and YL for the adjusted shape of FIG. 17(B) are obtained as $$XL=\alpha \quad (28a)$$

$$YL=yL \quad (28b)$$

[S79] The length parameters XL and YL for the adjusted shape of FIG. 17(B) are obtained as $$XL=xL \quad (29a)$$

$$YL=\beta \quad (29b)$$

Incidentally, when the individual mode is specified as the clipping processing mode, the step S75 can be configured so that an "automatic participant selection mode" will be available as an option for the system operator. If this is the case, calculation and comparison of some parameters are required so as to automatically select a particular clipping window HRm. The parameters may include the area or average motion of a portrait rectangle or a face rectangle. When a specific person's image shows large values for all those parameters, he/she is probably a speaker. It is quite reasonable to select the image of such person.

More specifically, the area Sn of a portrait rectangle and the area FSn of a face rectangle are calculated as $$Sn=lx \times ly \quad (30a)$$

$$FSn=flx \times fly \quad (30b)$$

Then the average movement Dave(n) of the portrait rectangle is obtained by $$Dave(n)=Dbody(n)+\alpha \times Dave(n-1) \quad (31)$$

where Dbody is defined by the following Equation (32).

$$Dbody(n)=|(x(n)+lx(n)/2)-(x(n-1)+lx(n-1)/2)|+|(y(n)+ly(n)/2)-(y(n-1)+ly(n-1)/2)| \quad (32)$$

Next, the average movement Fave(n) of the face rectangle is calculated as $$Fave(n)=Fbody(n)+\beta \times Fave(n-1) \quad (33)$$

where Fbody is defined by $$Fbody(n)=|(fx(n)+flx(n)/2)-(fx(n-1)+flx(n-1)/2)|+|(fy(n)+fly(n)/2)-(fy(n-1)+fly(n-1)/2)| \quad (34)$$

In the way described above, the image clipping circuit 63 clips a picture, and the image scaling circuit 64 enlarges or shrinks the clipped picture so that it will fit to the monitor screen. The adjusted clipped picture is then stored in a clipped frame buffer 65. The image compression circuit 66 retrieves the picture from the clipped frame buffer 65 and encodes them by using video data compression techniques such as the ITU-T videoconferencing standards H.261. The coded frame data is transmitted to the receiving end.

FIGS. 18(A), 18(B), and 18(C) are a time sequence of screen shots showing how the portrait rectangle is clipped from a source picture captured by the camera 51. In each of FIGS. 18(A), 18(B), and 18(C), the left hand diagram shows a source picture provided from the camera 51; the central diagram shows a full-range picture displayed on a screen, which also illustrates the image clipping window; the right hand diagram shows the clipped picture that is adjusted to the screen size.

As the three left-hand pictures indicate, the person is moving from left to right in the picture. In the second embodiment of the present invention, the system can catch up with the movement of the person.

FIG. 19(A) is a source picture captured by the camera 51. FIG. 19(B) shows a group shot clipped from the source picture, while FIGS. 19(C)–19(E) present the individual clips of three participants. Such individual clips can be obtained through an automatic selection as explained in step S75 of FIG. 16. Further, it is also possible for the operator to choose a particular person by clicking his/her image in a group shot.

The above discussion will be summarized as follows. According to the present invention, the participant position detection means first locates a participant's face in a received camera shot and, based on this face position, it detects the position of his/her body. Subsequently, the image clipping means determines an image area suitable for displaying each participant according to the magnitude of the his/her on-screen motion, and then cuts out the relevant part of the original camera shot.

More specifically, the participant position detection means determines a larger image area for a larger on-screen motion and a smaller image area for a smaller on-screen motion. It extracts a picture of the determined range out of the source picture captured by the camera. Lastly, the screen adjustment means adjusts the size of the clipped picture provided by the image clipping means so that it will fit to the monitor screen.

In the way described above, the display control system of the present invention reliably executes the image extraction for each participant and clearly displays the picture by keeping track of his/her movement and automatically zooming in and out on the picture.

Also, the present invention uses combined information on the interframe difference and intraframe difference to control the clipping window, thereby obtaining correct portrait pictures responsive to even a large movement of the subject.

Furthermore, the present invention performs precise detection of participant positions as well as face positions. Even if the subject's motion is relatively small, the system can keep track of the subject image.

The present invention extracts features of each subject image and compares them with the predefined parameters that describes realistic proportion of human body. Therefore, the system can clearly discriminates the human image from the others.

Further, the facial color matching functions are implemented in the system, which helps recognition of inactive participants' images.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A display control system for a videoconference terminal capable of displaying a proper image of a participant in a videoconference, comprising:

participant position detection means for detecting a participant position based on a wide-angle source picture provided by a camera;

image clipping means for determining a clipping window which includes the image of the participant, according to an on-screen movement of the participant position detected by said participant position detection means, and for obtaining a clipped picture by cutting an image within the clipping window out of the wide-angle source picture; and screen adjustment means for making a size adjustment of the clipped picture obtained by said image clipping means so that the clipped picture will fit to a screen size of a video monitor unit, wherein said participant position detection means comprises face position detection means for detecting a face position of the participant based on the wide-angle source picture provided by the camera, and body position detection means for detecting a body position of the participant by using the face position detected by said face position detection means as a reference point.

2. The display control system according to claim 1, wherein said face position detection means comprises facial color searching means for finding a first image portion which is likely to be the face position of the participant by comparing color data contained in the wide-angle source picture with a predetermined facial color, motion searching means for finding a second image portion of the wide-angle source picture, which exhibits a high degree of motion, and face position determination means for determining the face position of the participant, based on the first image portion found by said facial color searching means and the second image portion found by said motion searching means.

3. The display control system according to claim 2, wherein said face position detection means further comprises sampling means for obtaining a sampled image by sampling the wide-angle source picture provided by the camera at predetermined pixel intervals, said facial color searching means finds the first image portion by using said sampled image obtained by said sampling means, and said motion searching means finds the second image portion by using said sampled image obtained by said sampling means.

4. The display control system according to claim 2, wherein said motion searching means finds the second image portion at predetermined frame intervals.

5. The display control system according to claim 2, wherein said facial color searching means compares the color data contained in the wide-angle source picture with a plurality of predetermined facial color samples so as to obtain a similarity in color space, and evaluates the likelihood to be the face position of the participant based on the similarity in color space.

6. The display control system according to claim 2, wherein said facial color searching means comprises color bias detection means for detecting a color bias observed in an entire range of the wide-angle source picture provided by the camera, and color bias compensation means for compensating the wide-angle source picture for the color bias detected by said color bias detection means.

7. The display control system according to claim 2, wherein said facial color searching means comprises facial color sample setting means for setting a facial color extracted from the face position as a new facial color sample for future use, when the face position is successfully determined by said face position determination means.

8. The display control system according to claim 1, wherein said body position detection means comprises holding means for holding a predefined characteristic parameter concerning the body position of the participant, area determination means for determining a candidate area which is likely to be the body position, based on the face position detected by said face position detection means, while referring to the predefined characteristic parameter held in said holding means, motion detection means for detecting a motion within the candidate area determined by said area determination means, and body position determination means for recognizing the body position when said motion detection means detected a motion at pixels as part of the candidate area.

9. A display control system for a videoconference terminal capable of displaying a proper image of a participant in a videoconference, comprising:

participant position detection means for detecting a participant position based on a wide-angle source picture provided by a camera;

image clipping means for determining a clipping window which includes the image of the participant, according to an on-screen movement of the participant position detected by said participant position detection means, and for obtaining a clipped picture by cutting an image within the clipping window out of the wide-angle source picture; and screen adjustment means for making a size adjustment of the clipped picture obtained by said image clipping means so that the clipped picture will fit to a screen size of a video monitor unit, wherein said image clipping means comprises movement detection means for detecting the on-screen movement of the participant position detected by said participant position detection means, clipping window setting means, coupled to said movement detection means, for setting a large clipping window when the on-screen movement is large and a small clipping window when the on-screen movement is small, and image extraction means for extracting, out of the wide-angle source picture provided by the camera, the image within the clipping window set by said clipping window setting means.

10. A display control system for a videoconference terminal capable of displaying a proper image of a plurality of participants in a videoconference, comprising:

face position/area detection means for detecting face positions and face areas of the plurality of participants based on a wide-angle source picture provided by a camera;

body position detection means for selecting one of the plurality of participants that exhibits the largest face area among the face areas detected by said face position/area detection means, and detecting a body position of the selected participant by using the face position thereof as a reference point;

image clipping means for determining a clipping window which includes the image of the selected participant, according to an on-screen movement of the body position detected by said body position detection means, and for obtaining a clipped picture by cutting an image within the clipping window out of the wide-angle source picture provided by the camera; and screen adjustment means for making a size adjustment of the clipped picture obtained by said image clipping means so that the clipped picture will fit to a screen size of a video monitor unit.

11. A display control system for a videoconference terminal capable of displaying a proper image of a plurality of participants in a videoconference, comprising:

face position/area detection means for detecting face positions and face areas of the plurality of participants based on a wide-angle source picture provided by a camera;

body position detection means for selecting one of the plurality of participants that exhibits the largest face area among the face areas detected by said face position/area detection means, and detecting a body position of the selected participant by using the face position thereof as a reference point;

first image clipping means for determining a first clipping window which includes the image of the selected participant, according to an on-screen movement of the body position detected by said body position detection means, and for obtaining a first clipped picture by cutting an image within the first clipping window out of the wide-angle source picture provided by the camera;

participant position detection means for detecting individual participant positions based on a wide-angle source picture captured by a camera;

second image clipping means for determining a second clipping window which includes the images of the participants, according to on-screen movements of the individual participant positions detected by said participant position detection means, and for obtaining a second clipped picture by cutting an image within the second clipping window out of the wide-angle source picture;

clipped picture selection means for selecting one of the first and second clipped pictures; and screen adjustment means for making a size adjustment of the selected clipped picture provided by said clipped picture selection means so that the selected clipped picture will fit to a screen size of a video monitor unit.

* * * * *